United States Patent
Elshafie et al.

(10) Patent No.: US 11,765,703 B2
(45) Date of Patent: Sep. 19, 2023

(54) JOINT RELAYING OF A TRANSPORT BLOCK

(71) Applicant: QUALCOMM Incorporated, San Diego, CA (US)

(72) Inventors: Ahmed Elshafie, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/347,355

(22) Filed: Jun. 14, 2021

(65) Prior Publication Data

US 2022/0400481 A1    Dec. 15, 2022

(51) Int. Cl.
*H04J 3/00* (2006.01)
*H04W 72/0446* (2023.01)

(52) U.S. Cl.
CPC .............. *H04W 72/0446* (2013.01)

(58) Field of Classification Search
CPC ... H04L 1/1854; H04L 1/1614; H04L 1/1812; H04L 5/0055; H04W 72/23; H04W 72/02
See application file for complete search history.

(56) References Cited

U.S. PATENT DOCUMENTS

| | | | |
|---|---|---|---|
| 11,438,899 B2* | 9/2022 | Nam | H04L 5/003 |
| 11,546,091 B2* | 1/2023 | Chen | H04L 1/1812 |
| 2011/0092154 A1* | 4/2011 | Horiuchi | H04W 72/02 |
| | | | 455/7 |
| 2016/0295565 A1* | 10/2016 | Kim | H04W 72/04 |
| 2017/0026297 A1* | 1/2017 | Sun | H04L 47/25 |
| 2020/0059341 A1* | 2/2020 | Zhang | H04W 72/23 |
| 2020/0127775 A1* | 4/2020 | Su | H04L 1/1854 |
| 2020/0259600 A1* | 8/2020 | Cao | H04L 1/1819 |
| 2020/0295878 A1* | 9/2020 | Choi | H04L 1/1614 |
| 2021/0036763 A1* | 2/2021 | Nam | H04L 1/08 |
| 2021/0036819 A1* | 2/2021 | Nam | H04L 5/0064 |
| 2022/0116148 A1* | 4/2022 | Baldemair | H04L 1/1812 |
| 2022/0132470 A1* | 4/2022 | Wang | H04W 72/044 |

OTHER PUBLICATIONS

International Search Report and Written Opinion—PCT/US2022/030535—ISA/EPO—dated Sep. 19, 2022.

\* cited by examiner

*Primary Examiner* — Abdelnabi O Musa
(74) *Attorney, Agent, or Firm* — Loza & Loza, LLP

(57) ABSTRACT

Aspects relate to joint relaying of a transport block. For example, a first relay (e.g., a first user equipment) and a second relay (e.g., a second user equipment) may each relay at least a portion of the transport block during different resource elements of the same slot. In some examples, the second relay continues encoding the transport block at the point where the first relay completes its encoding. In some examples, the first relay and the second relay independently encode transport block data. In some examples, the first relay and the second relay are each allocated complete symbols within the slot.

30 Claims, 23 Drawing Sheets

JOINT RELAYING OF A TRANSPORT BLOCK

TECHNICAL FIELD

The technology discussed below relates generally to wireless communication and, more particularly, to multiple wireless communication devices jointly relaying a transport block.

INTRODUCTION

In many existing wireless communication systems, a cellular network is implemented by enabling wireless communication devices to communicate with one another through signaling with a nearby base station or cell. As a wireless communication device moves across the service area, handovers take place such that each wireless communication device maintains communication with one another via its respective cell.

Another scheme for a wireless communication system is a device to device (D2D) network, in which wireless communication devices may signal one another directly, rather than via an intermediary base station or cell. D2D communication networks may utilize direct signaling (e.g., sidelink signaling) to facilitate direct communication between wireless communication devices over a proximity service (ProSe) PC5 interface. In some D2D configurations, wireless communication devices may further communicate in a cellular system, generally under the control of a base station. Thus, the wireless communication devices may be configured for uplink and downlink signaling via a base station and further for sidelink signaling directly between the wireless communication devices without transmissions passing through the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a user equipment is disclosed. The method may include determining that the first user equipment and a second user equipment are to jointly relay a transport block during a slot, receiving the transport block, encoding at least a first portion of the transport block to provide first encoded data, and transmitting the first encoded data during the slot.

In some examples, a user equipment may include a transceiver, a memory, and a processor coupled to the transceiver and the memory. The processor and the memory may be configured to determine that the first user equipment and a second user equipment are to jointly relay a transport block during a slot, receive the transport block via the transceiver, encode at least a first portion of the transport block to provide first encoded data, and transmit the first encoded data during the slot via the transceiver.

In some examples, a user equipment may include means for determining that the first user equipment and a second user equipment are to jointly relay a transport block during a slot, means for receiving the transport block, means for encoding at least a first portion of the transport block to provide first encoded data, and means for transmitting the first encoded data during the slot.

In some examples, an article of manufacture for use by a user equipment includes a non-transitory computer-readable medium having stored therein instructions executable by one or more processors of the user equipment to determine that the first user equipment and a second user equipment are to jointly relay a transport block during a slot, receive the transport block, encode at least a first portion of the transport block to provide first encoded data, and transmit the first encoded data during the slot.

In some examples, a method for wireless communication at a wireless communication device is disclosed. The method may include determining that a first user equipment and a second user equipment are to jointly relay a transport block to the wireless communication device, receiving first encoded data for at least a first portion of the transport block from the first user equipment during a slot, receiving second encoded data for at least a second portion of the transport block from the second user equipment during the slot, and processing the first encoded data and the second encoded data to derive the transport block.

In some examples, a wireless communication device may include a transceiver, a memory, and a processor coupled to the transceiver and the memory. The processor and the memory may be configured to determine that a first user equipment and a second user equipment are to jointly relay a transport block to the wireless communication device, receive first encoded data for at least a first portion of the transport block via the transceiver from the first user equipment during a slot, receive second encoded data for at least a second portion of the transport block via the transceiver from the second user equipment during the slot, and process the first encoded data and the second encoded data to derive the transport block.

In some examples, a wireless communication device may include means for determining that a first user equipment and a second user equipment are to jointly relay a transport block to the wireless communication device, means for receiving first encoded data for at least a first portion of the transport block from the first user equipment during a slot, means for receiving second encoded data for at least a second portion of the transport block from the second user equipment during the slot, and means for processing the first encoded data and the second encoded data to derive the transport block.

In some examples, an article of manufacture for use by a wireless communication device includes a non-transitory computer-readable medium having stored therein instructions executable by one or more processors of the wireless communication device to determine that a first user equipment and a second user equipment are to jointly relay a transport block to the wireless communication device, receive first encoded data for at least a first portion of the transport block from the first user equipment during a slot, receive second encoded data for at least a second portion of the transport block from the second user equipment during the slot, and process the first encoded data and the second encoded data to derive the transport block.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
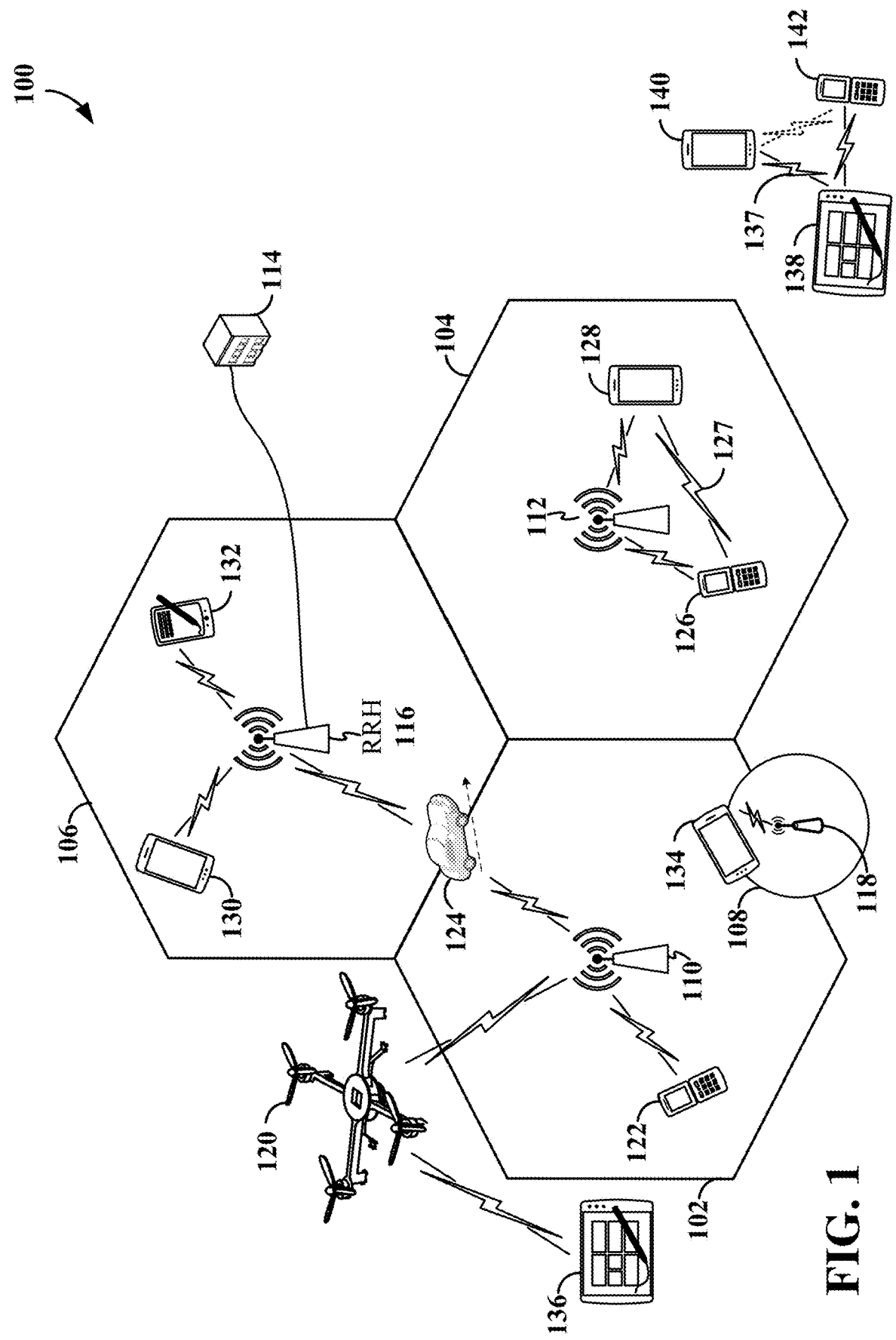
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to joint relaying of a data transmission. For example, a first relay (e.g., a first user equipment) and a second relay (e.g., a second user equipment) may each relay at least a portion of a transport block received from a wireless communication device (e.g., a UE). Here, the first relay may relay its transport block data during a first set of resource elements of a slot and the second relay may relay its transport block data during a second set of resource elements of that same slot. In some examples, the first relay encodes and transmits a first portion of a transport block and the second relay continues encoding the transport block at the point where the first relay completed its encoding. In some examples, the first relay and the second relay independently encode transport block data. In some examples, the first relay encodes and transmits the entire transport block or a specified portion of the transport block and the second relay then uses the remainder of the slot to transmit at least a portion of the transport block. In some examples, the first relay and the second relay are each allocated complete symbols within the slot. In some examples, the first relay and the second relay may use different modulation parameters (e.g., different modulation orders) to transmit their respective transport block data. In some examples, a base station transmits a configured grant to schedule resources for joint relaying of transport blocks. In some examples, the slot is configured with a gap between resource allocations for different relays.

The various concepts presented throughout this disclosure may be implemented across a broad variety of telecommunication systems, network architectures, and communication standards. Referring now to FIG. 1, as an illustrative example without limitation, a schematic illustration of a radio access network (RAN) 100 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eU-TRAN) standards, often referred to as Long Term Evolution (LTE). The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station (e.g., the UAV 120). Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on Institute of Electrical and Electronics Engineers (IEEE) 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full-duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
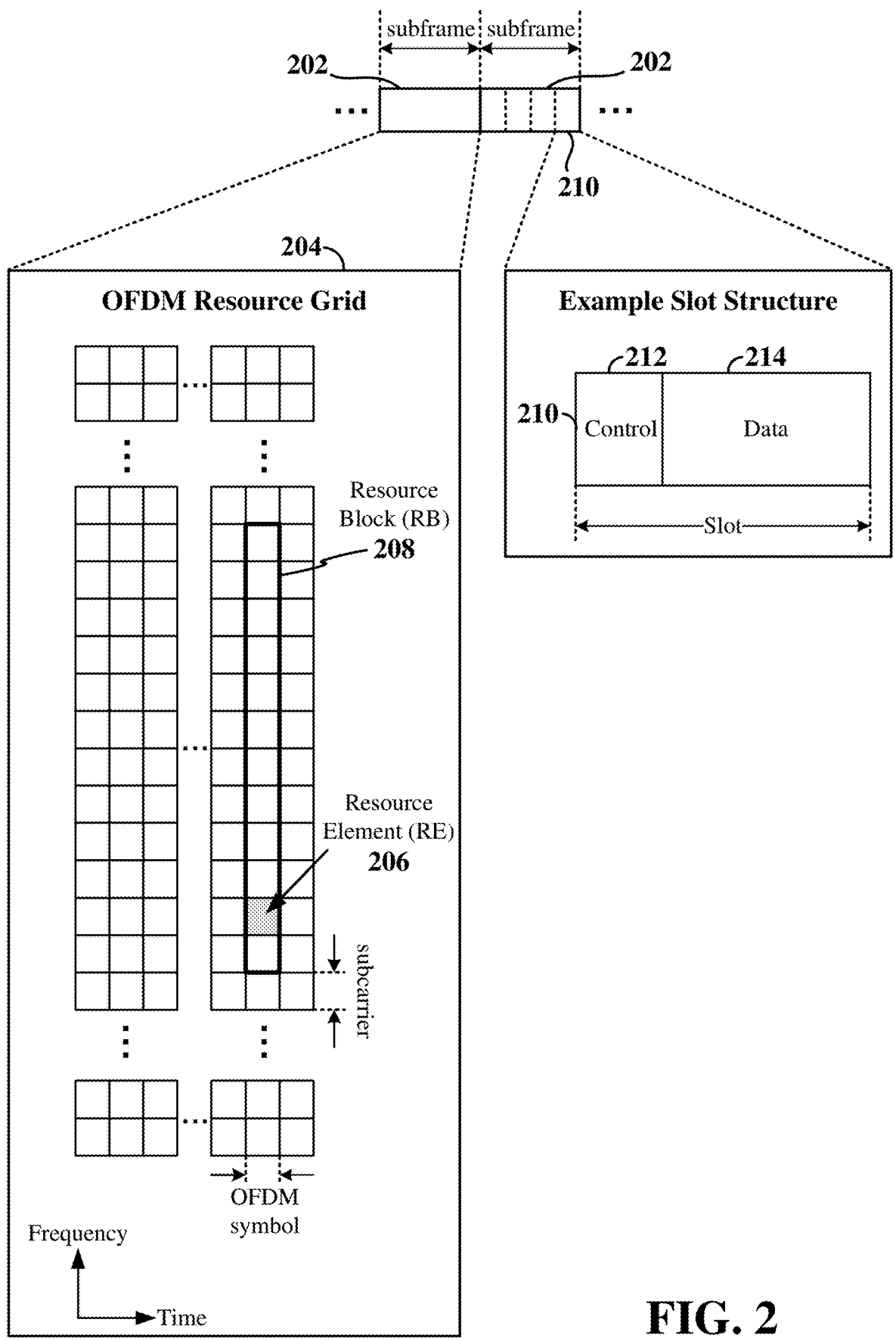
FIG. 2 is a schematic diagram illustrating organization of wireless resources in an air interface utilizing orthogonal frequency divisional multiplexing (OFDM) according to some aspects.

Referring now to FIG. 2, an expanded view of an example subframe 202 is illustrated, showing an OFDM resource grid. However, as those skilled in the art will readily appreciate, the physical layer (PHY layer) transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely an example, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., abase station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
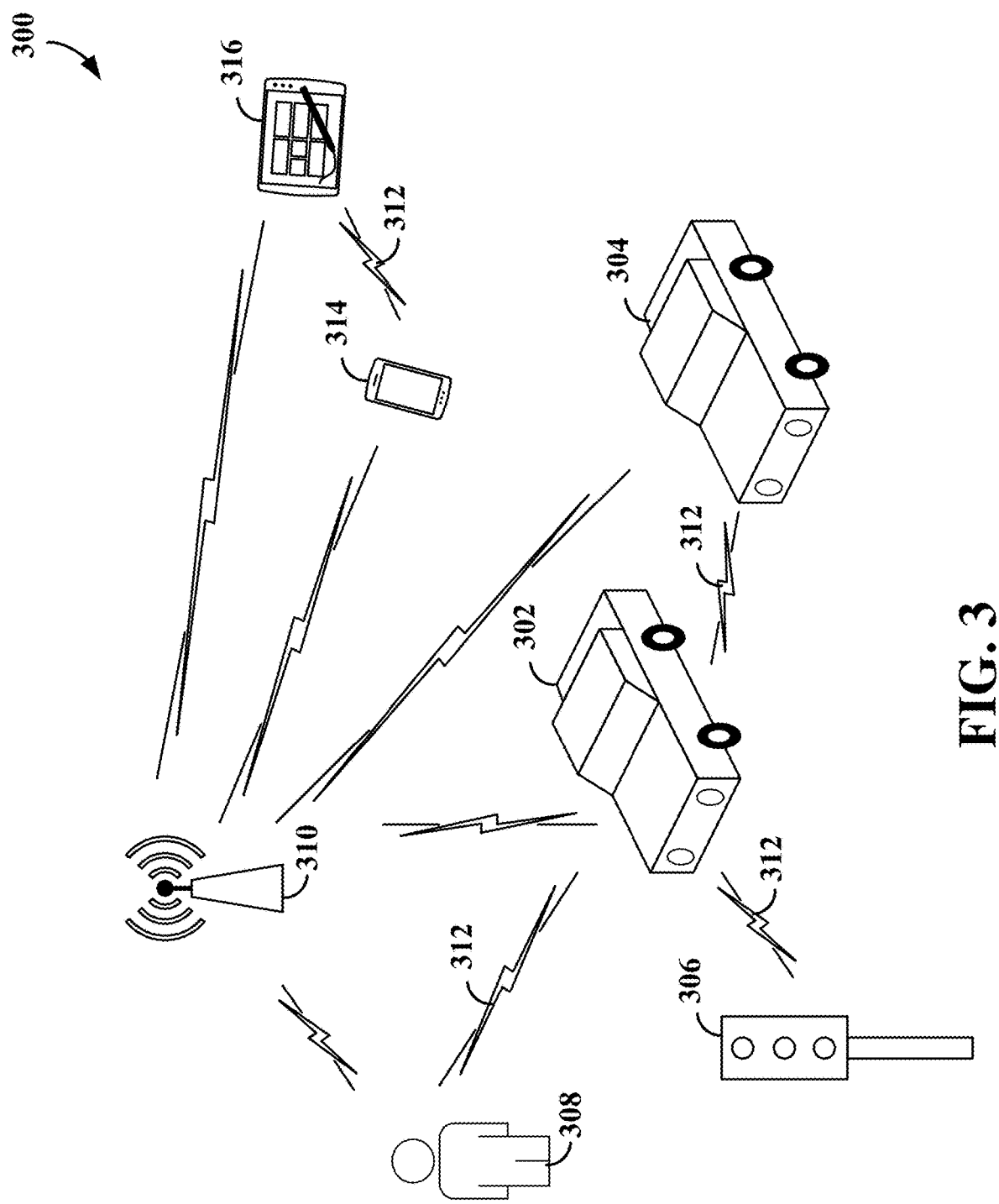
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

V2X transmissions may include, for example, unicast transmissions, groupcast transmissions, and broadcast transmissions. A unicast transmission may include, for example, a transmission from a vehicle (e.g., vehicle 302) to one other vehicle (e.g., vehicle 304). A groupcast transmission may include, for example, a transmission when group of UEs (e.g., vehicles 302 and 304) form a cluster. In this case, data may be groupcasted within the cluster. A broadcast transmission may include, for example, a transmission from a UE (e.g., vehicle 302) to surrounding receivers (e.g., vehicle 304, a roadside unit (RSU) 306, mobile devices 308 of pedestrians/cyclists, the network (e.g., base station 310), or any combination thereof) in proximity to the transmitting UE.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include public safety or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. The base station 310 may further activate preconfigured sidelink grants (e.g., configured grants) for sidelink communication among the sidelink devices. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

Figure 4:
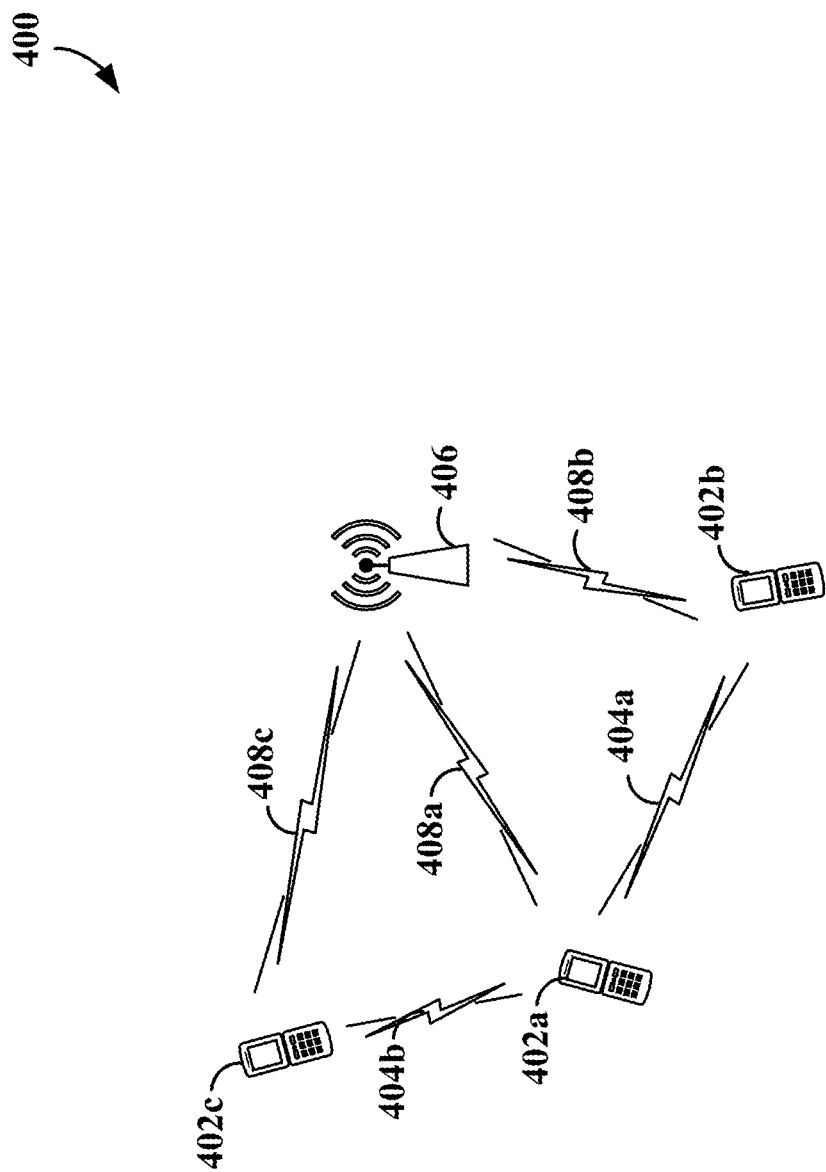
FIG. 4 is a diagram illustrating an example of a wireless communication network for facilitating both cellular and sidelink communication according to some aspects.

FIG. 4 is a diagram illustrating an example of a wireless communication network 400 for facilitating both cellular and sidelink communication. The wireless communication network 400 may correspond, for example, to the RAN 100 illustrated in FIG. 1. The wireless communication network 400 includes a plurality of wireless communication devices 402a, 402b, and 402c and a base station (e.g., eNB or gNB) 406. In some examples, the wireless communication devices 402a, 402b, and 402c may be UEs capable of implementing sidelink communication (e.g., V2X or D2D). The wireless communication devices 402a, 402b, and 402c may correspond to any of the UEs or scheduled entities shown in any of FIGS. 1, 3, 6, 18, 19, 20, and 22. The base station 406 may correspond to any of the base stations or scheduling entities shown in any of FIGS. 1, 3, 6, 18, 19, and 22.

The wireless communication devices 402a and 402b may communicate over a first sidelink 404a, while wireless communication devices 402a and 402c may communicate over a second sidelink 404b. Each of the sidelinks 404a and 404b may utilize, for example, a PC5 interface. Wireless communication devices 402a, 402b, and 402c may further communicate with the base station 406 over respective Uu links 408a, 408b, and 408b. The sidelink communication over the sidelinks 404a and 404b may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

In some examples, a common carrier may be shared between the sidelinks 404a and 404b and Uu links 408a-408c, such that resources on the common carrier may be allocated for both sidelink communication between wireless communication devices 402a-402c and cellular communication (e.g., uplink and downlink communication) between the wireless communication devices 402a-402c and the base station 406. For example, the wireless communication network 400 may be configured to support a Mode 1 sidelink network in which resources for both sidelink and cellular communication are scheduled by the base station 406. In other examples in which Mode 2 sidelink is implemented on the sidelinks 404a and 404b, the wireless communication devices 402a-402c may autonomously select sidelink resources (e.g., from one or more frequency bands or sub-bands designated for sidelink communication) for communication therebetween. In this example, the wireless communication devices 402a-402c may function as both scheduling entities and scheduled entities scheduling sidelink resources for communication with each other.

Figure 5A:
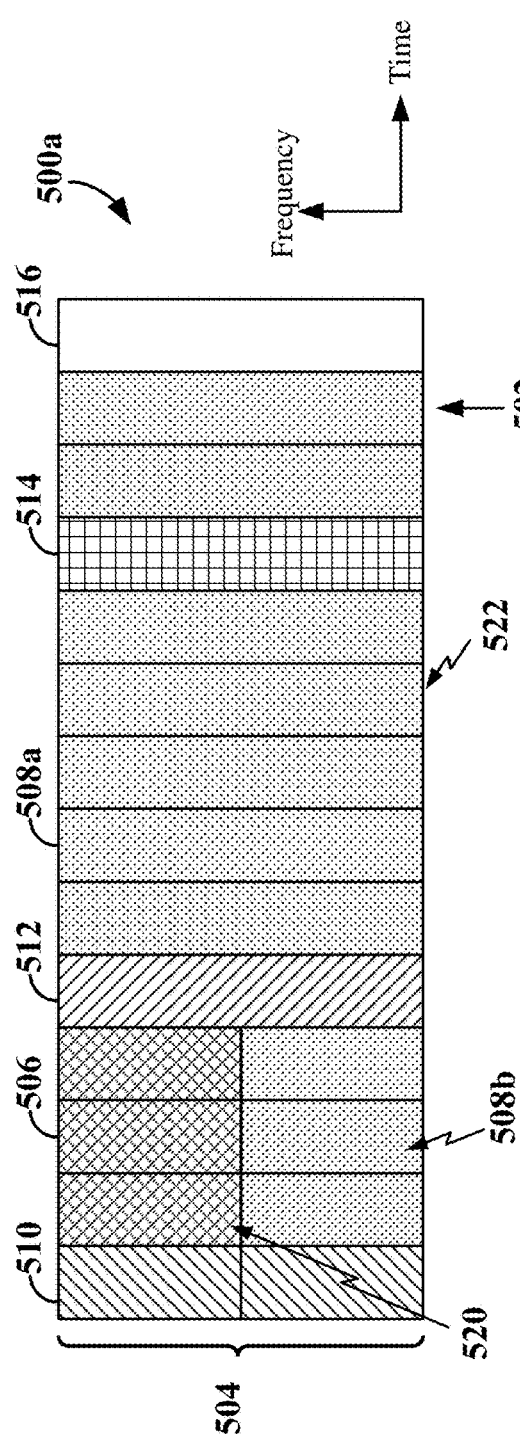
FIG. 5A is a conceptual diagram illustrating an example of a sidelink slot structure according to some aspects.
Figure 5B:
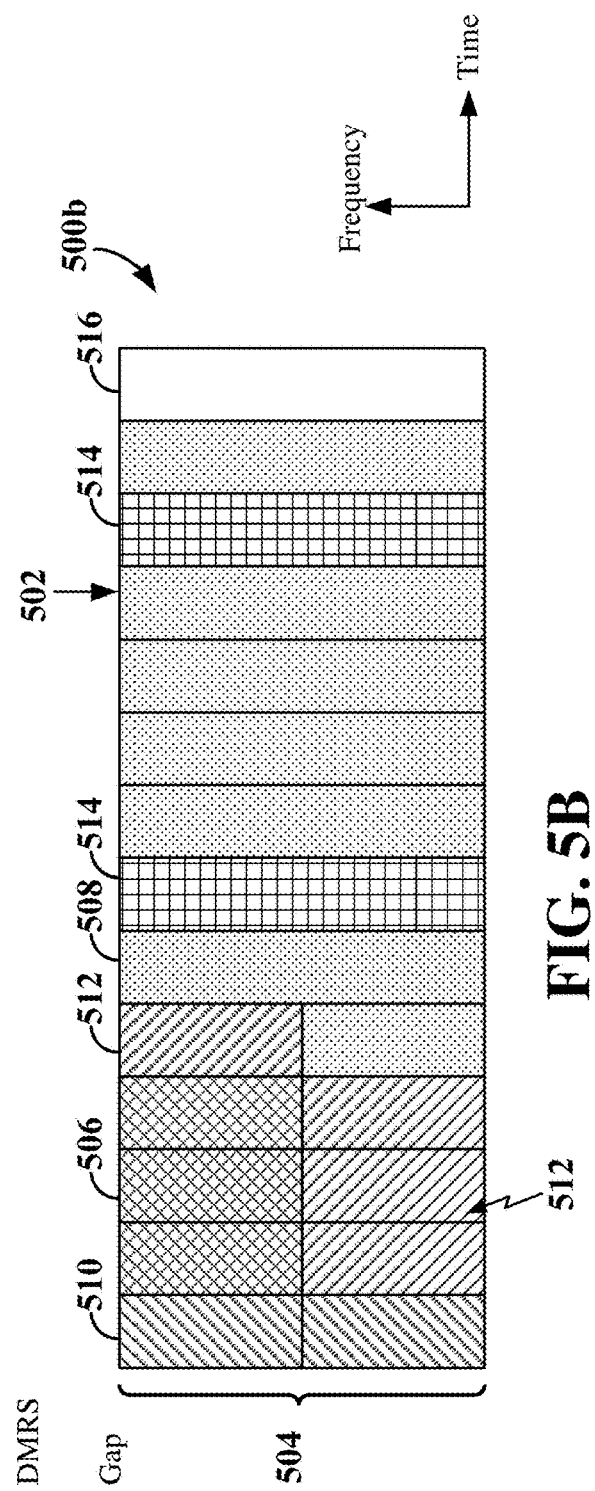
FIG. 5B is a conceptual diagram illustrating another example of a sidelink slot structure according to some aspects.

FIGS. 5A and 5B are diagrams illustrating examples of sidelink slot structures according to some aspects. The sidelink slot structures may be utilized, for example, in a V2X or other D2D network implementing sidelink. In the examples shown in FIGS. 5A and 5B, time is in the horizontal direction with units of symbols 502 (e.g., OFDM symbols); and frequency is in the vertical direction. Here, a carrier bandwidth 504 allocated for sidelink wireless communication is illustrated along the frequency axis. The carrier bandwidth 504 may include a plurality of sub-channels, where each sub-channel may include a configurable number of PRBs (e.g., 10, 14, 20, 24, 40, 44, or 100 PRBs).

Each of FIGS. 5A and 5B illustrate an example of a respective slot 500a or 500b including fourteen symbols 502 that may be used for sidelink communication. However, it should be understood that sidelink communication can be configured to occupy fewer than fourteen symbols in a slot 500a or 500b, and the disclosure is not limited to any particular number of symbols 502. Each sidelink slot 500a and 500b includes a physical sidelink control channel (PSCCH) 506 occupying a control region of the slot 500a and 500b and a physical sidelink shared channel (PSSCH) 508 occupying a data region 520 of the slot 500a and 500b. The PSCCH 506 and PSSCH 508 are each transmitted on one or more symbols 502 of the slot 500a. The PSCCH 506 includes, for example, SCI-1 that schedules transmission of data traffic on time-frequency resources of the corresponding PSSCH 508. As shown in FIGS. 5A and 5B, the PSCCH 506 and corresponding PSSCH 508 are transmitted in the same slot 500a and 500b. In other examples, the PSCCH 506 may schedule a PSSCH in a subsequent slot.

In some examples, the PSCCH 506 duration is configured to be two or three symbols. In addition, the PSCCH 506 may be configured to span a configurable number of PRBs, limited to a single sub-channel. For example, the PSCCH 506 may span 10, 12, 14, 20, or 24 PRBs of a single sub-channel. A DMRS may further be present in every PSCCH symbol. In some examples, the DMRS may be placed on every fourth RE of the PSCCH 506. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 5A and 5B, the starting symbol for the PSCCH 506 is the second symbol of the corresponding slot 500a or 500b and the PSCCH 506 spans three symbols.

The PSSCH 508 may be time-division multiplexed (TDMed) with the PSCCH 506 and/or frequency-division multiplexed (FDMed) with the PSCCH 506. In the example shown in FIG. 5A, the PSSCH 508 includes a first portion 508a that is TDMed with the PSCCH 506 and a second portion 508b that is FDMed with the PSCCH 506. In the example shown in FIG. 5B, the PSSCH 508 is TDMed with the PSCCH 506.

One and two layer transmissions of the PSSCH 508 may be supported with various modulation orders (e.g., quadrature phase-shift keying (QPSK), or quadrature amplitude modulation (QAM) such as 16-QAM, 64-QAM and 246-QAM). In addition, the PSSCH 508 may include DMRSs 514 configured in a two, three, or four symbol DMRS pattern. For example, slot 500a shown in FIG. 5A illustrates a two symbol DMRS pattern, while slot 500b shown in FIG. 5B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500a or 500b. In addition, a gap symbol 516 is present after the PSSCH 508 in each slot 500a and 500b.

Each slot 500a and 500b further includes SCI-2 512 mapped to contiguous RBs in the PSSCH 508 starting from the first symbol containing a PSSCH DMRS. In the example shown in FIG. 5A, the first symbol containing a PSSCH DMRS is the fifth symbol occurring immediately after the last symbol carrying the PSCCH 506. Therefore, the SCI-2 512 is mapped to RBs within the fifth symbol. In the example shown in FIG. 5B, the first symbol containing a PSSCH DMRS is the second symbol, which also includes the PSCCH 506. In addition, the SCI-2/PSSCH DMRS 512 are shown spanning symbols two through five. As a result, the SCI-2/PSSCH DMRS 512 may be FDMed with the PSCCH 506 in symbols two through four and TDMed with the PSCCH 506 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 506 may be blind decoded at the receiving wireless communication device. However, since the format, starting location, and number of REs of the SCI-2 512 may be derived from the SCI-1, blind decoding of SCI-2 is not needed at the receiver (receiving UE).

In each of FIGS. 5A and 5B, the second symbol of each slot 500a and 500b is copied onto (repeated on) a first symbol 510 thereof for automatic gain control (AGC) settling. For example, in FIG. 5A, the second symbol containing the PSCCH 506 FDMed with the PSSCH second portion 508b may be transmitted on both the first symbol and the second symbol. In the example shown in FIG. 5B, the second symbol containing the PSCCH 506 FDMed with the SCI-2/PSSCH DMRS 512 may be transmitted on both the first symbol and the second symbol.

Figure 6:
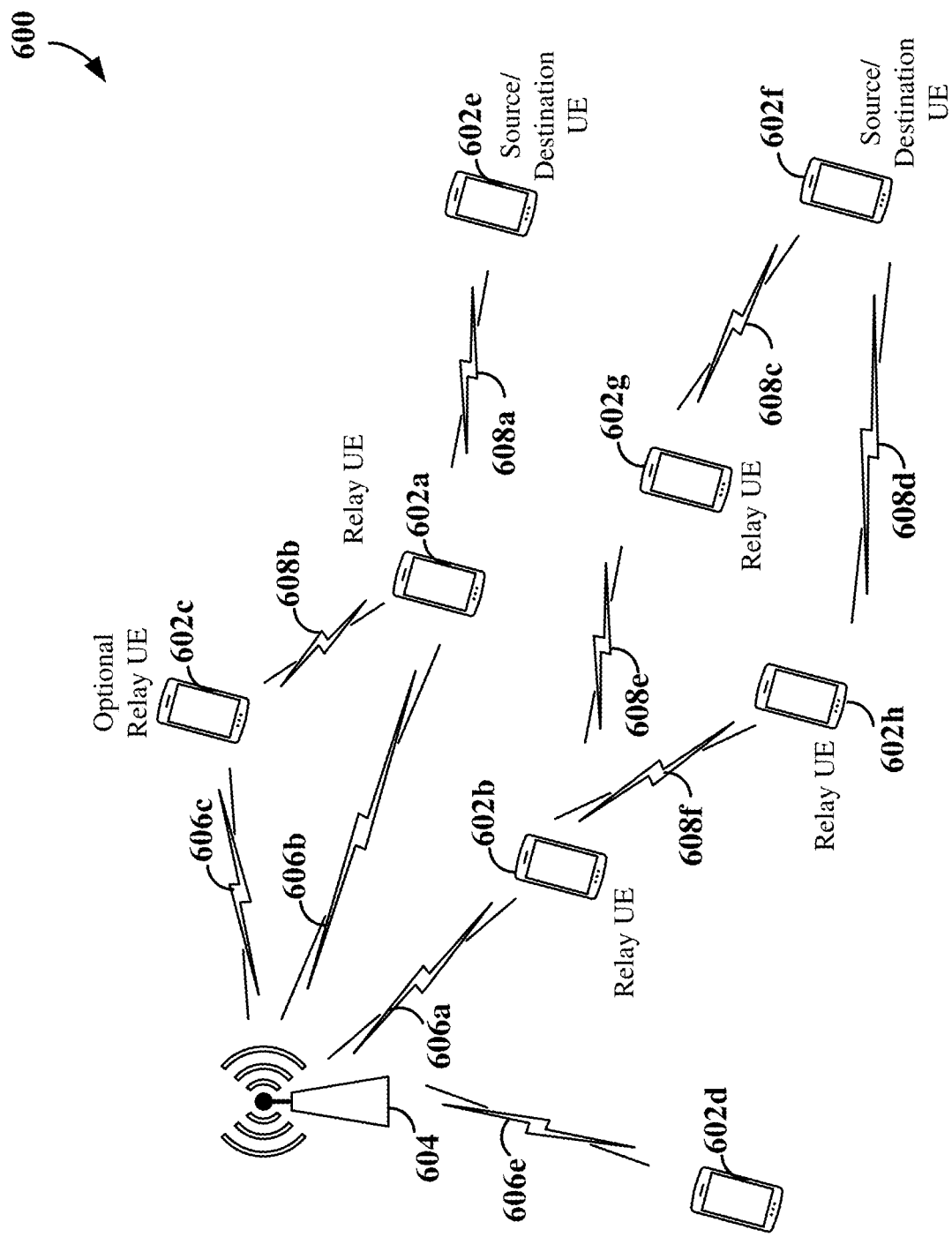
FIG. 6 is a diagram illustrating an example of a wireless communication network for facilitating sidelink relaying according to some aspects.

In some examples, a device that supports D2D communication may be used to relay data from one device (e.g., a base station or a sidelink device) to another device (e.g., a base station or a sidelink device). FIG. 6 is a diagram illustrating an exemplary wireless communication network 600 employing D2D relaying. The wireless communication network 600 may correspond, for example, to the RAN 100 illustrated in FIG. 1. The wireless communication network 600 may include a fifth generation base station (e.g., a gNB) 604 in wireless communication one or more UEs 602a, 602b, 602c, 602d, 602e, 602f, 602g, and 602h. In the example shown in FIG. 6, the base station 604 may directly communicate with each of the UEs 602a, 602b, 602c, and 602d via a respective wireless communication link 606a, 606b, 606c, and 606d (e.g., Uu links). Each of the wireless communication links 606a, 606b, 606c, and 606d may utilize a sub-6 GHz carrier frequency or a mmWave carrier frequency. The UEs 602a, 602b, 602c, 602d, 602e, 602f, 602g, and 602h may correspond to any of the UEs or scheduled entities shown in any of FIGS. 1, 3, 4, 18, 19, 20, and 22. The base station 604 may correspond to any of the base stations or scheduling entities shown in any of FIGS. 1, 3, 4, 18, 19, and 22.

In addition, a D2D relay link (e.g., a sidelink) 608a may be established between the UE 602a and another UE 602e to enable relaying of information between the base station 604 and the UE 602e. In this context, the UE 602a may be referred to as a relay UE and the UE 602e may be referred to as a source UE for uplink communication or a destination UE for downlink communication. The relay link 608a may be established between the UE 602a and UE 602e due to, for example, distance or signal blocking between the base station 604 and UE 602e, weak receiving capability of the UE 602e, low transmission power of the UE 602e, and/or limited battery capacity of UE 602e.

In some examples, the relay link 608a between UEs 602a and 602e may enable communication between the base station 604 and UE 602e to be relayed via UE 602a over wireless communication link (e.g., the Uu interface) 606a and relay link 608a. In some examples, the UE 602a may communicate with the base station 604 via another relay UE. For example, a D2D relay link 608b may be established between the UE 602a and the UE 602c to enable relaying of information between the base station 604 and the UE 602a. Thus, information exchanged between the base station 604 and the UE 602e may be routed via the link 606b, via the links 608b and 606c, or via both of these paths.

In some examples, data may be relayed over multiple paths to increase the likelihood that the data will reach the intended destination (e.g., since some paths may be less reliable than others) and/or reduce the amount of time that it takes the data to reach the intended destination (e.g., by providing diversity to enable a receiving device to readily decode the data). For example, a D2D relay link 608c may be established between the UE 602f and the UE 602g and another D2D relay link 608e may be established between the UE 602g and the UE 602b to enable relaying of information between the base station 604 and the UE 602f. In addition, a D2D relay link 608d may be established between the UE 602f and the UE 602h and another D2D relay link 608f may be established between the UE 602h and the UE 602b to also enable relaying of information between the base station 604 and the UE 602f.

In some examples, the base station 604 may use broadcast or groupcast signaling (e.g., transmitted via a Uu interface) to set up a multi-hop tunnel (e.g., for uplink communication and/or downlink communication) to an endpoint (e.g., a source UE or a destination UE) via at least one UE relay. For example, the base station 604 may schedule dedicated time and frequency resources for the relay(s) and the endpoint to use to relay data between the base station 604 and the endpoint.

In some examples, a sidelink UE may be able to discover its neighbor sidelink UEs. For example, the UE 602e (or any other UE of FIG. 6) may detect one or more neighbor relay UEs, awaken the neighbor relay UE(s), and receive and process discovery signals from the neighbor relay UE(s). In other examples, a UE may assist another UE in discovering and activating neighbor relay UEs. For example, the UE 602a may monitor a scope of possible frequency spectrums to identify the device bandwidth of one or more neighbor relay UEs, exchange messages with each of neighbor relay UE to determine the availability of each neighbor relay UE to relay data to and/or from the UE 602e, and then indicate to each available neighbor relays to transmit a discovery signal to the UE 602e.

The disclosure relates in some aspects to joint relaying of a data transmission by two or more relays. For purposes of explanation, the discussion that follows may refer to joint relaying of a transport block. It should be understood that this discussion may be applicable to data that is organized in other forms.

In some examples, each relay may encode and relay at least a portion of a transport block during the same slot. In a scenario that uses two relays for joint relaying, a first relay may transmit its encoded data during a first set of resource elements allocated for the relaying during the slot and a second relay may transmit its encoded data during a second set of resource elements allocated for the relaying during the slot.

A relay may take different forms in different examples. In some examples, a relay may be a so-called smart repeater (e.g., a repeater that performs decode and forward relaying). In some examples a relay may be a UE. In some examples, a relay may be a UE that supports sidelink communication. Other types of relays may be used in other examples. For convenience, the discussion that follows may simply refer to a UE that performs a relay operation. It should be understood that this discussion may be applicable to other types of relays as well. Also, for purposes of explanation, the discussion that follows may refer to joint relaying by a pair of UEs. It should be understood that more than two UEs may be used to relay data in some scenarios (e.g., to further increase the reliability and/or performance of the relaying operation).

In some aspects, different redundancy versions (RVs) may be used to provide combinable first information and second information that are relayed via different UEs. For example, a first UE may encode first information associated with a first RV and relay that information and a second UE may encode second information associated with a second RV (which may be the same as or different from the first RV) and relay that information.

RVs may be used, for example, in a hybrid automatic repeat request (HARQ) scheme. HARQ is a technique in which the integrity of packet transmissions (e.g., code blocks) by a transmitting device may be checked at a receiving device for integrity, e.g., utilizing any suitable integrity checking mechanism, such as a checksum or a cyclic redundancy check (CRC). If the integrity of the transmission is confirmed, the receiving device may transmit an ACK to the transmitting device. Conversely, if the integrity of the transmission is not confirmed, the receiving device may transmit a NACK to the transmitting device. In response to a NACK, the transmitting device may send a HARQ retransmission, which may implement chase combining, incremental redundancy, or some other retransmission scheme.

In chase combining HARQ (HARQ-CC), a retransmitted code block is identical to the original transmission of the code block. That is, if a code block is not decoded properly at the receiving device, resulting in a NACK, then the transmitting device may retransmit the full code block including information identical to the original transmission. The information may then ideally be obtained error-free by virtue of a process called soft combining, where the redundant bits from the retransmission may be combined before decoding to increase the probability of correct reception of each bit.

On the other hand, in incremental redundancy HARQ (HARQ-IR), the retransmitted code block may be different from the originally transmitted code block, and further, if multiple retransmissions are made, each retransmission may differ from one another. Here, retransmissions may include different sets of coded bits. The different sets of coded bits may correspond, for example, to different code rates or algorithms, to different portions of the original code block, some of which may not have been transmitted in the original transmission, to forward error correction (FEC) bits that were not transmitted in the original transmission, or other suitable coding. As with HARQ-CC, in HARQ-IR, the information may be obtained error-free by utilizing soft combining to combine the retransmitted bits with the original transmitted bits.

NR uses low density parity check (LDPC) codes for downlink shared channels. LDPC codes utilize HARQ-IR to send different redundancy versions (RVs) of data with each retransmission. For example, four redundancy versions may be sent in the following default order: redundancy version 0 (RV0), redundancy version 2 (RV2), redundancy version 3 (RV3), and redundancy version 1 (RV1). Other orders may be used in other examples. Each redundancy version may include systematic bits (e.g., bits carrying the information to be transmitted) and/or parity bits (e.g., bits carrying redundant information produced from combinations of the original information). For LDPC codes, not all RVs contain the same amount of systematic bits.

Figure 7:
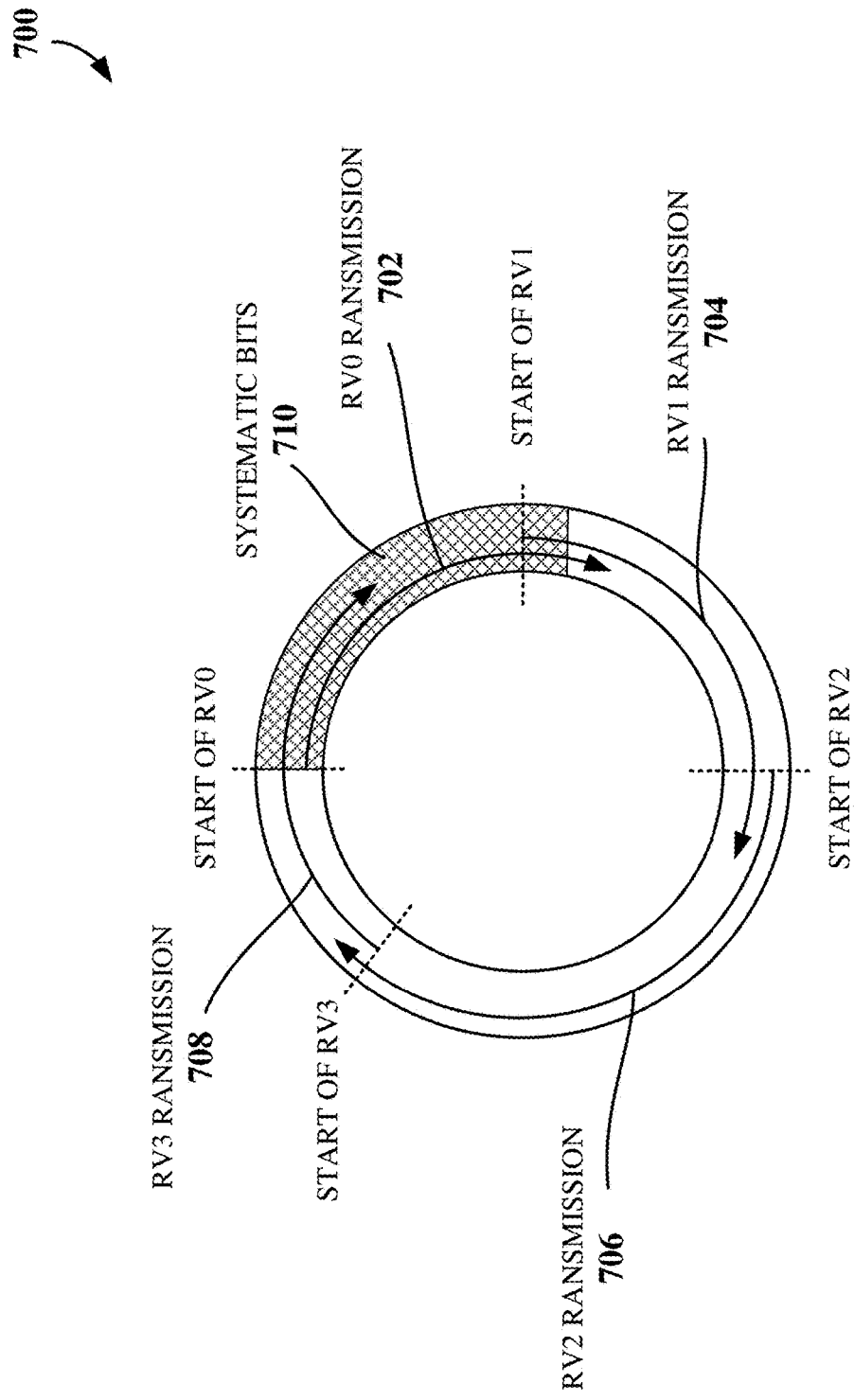
FIG. 7 is a conceptual illustration of a circular buffer and redundancy versions according to some aspects.

FIG. 7 illustrates a circular buffer 700 and associated RVs that may be used to transmit a set of data (e.g., a TB). A transmitting device may transmit data bits from the circular buffer 700, potentially repeating some of the data bits depending on the amount of resources allocated for the transmission. For example, one or more bits from the buffer may be modulated (e.g., by generating a QAM symbol) and sent via a resource element (RE). This process is repeated for successive bits in the circular buffer 700 until all of the allocated REs are used. If the number of allocated resources is larger than the size needed to send all of the data bits in the circular buffer 700, the transmission may continue until all of the resources are used (e.g., data bits may be sent more than once). Thus, for a given transmission, the data being transmitted will be rate-matched to the resources (e.g., REs) allocated for the transmission.

The circular buffer 700 conceptually illustrates that different bits may be associated with different RVs. A transmission using RV0 is represented by a first arrowed line 702, a transmission using RV1 is represented by a second arrowed line 704, a transmission using RV2 is represented by a third arrowed line 706, and a transmission using RV3 is represented by a fourth arrowed line 708. Other types of RVs may be used in other examples.

The shading depicted in FIG. 7 represents systematic bits 710. Here, it may be seen that RV0 and RV3 contain a significant number of systematic bits and are, as a result, self-decodable (e.g., it may be possible for a receiving device to decode the data using these bits, without the need for additional bits). Thus, an initial transmission by a device may start at the beginning of RV0 or RV3 so that the initial transmission may be self-decodable at a receiving device.

In contrast, RV1 and RV2 do not contain a significant number of systematic bits (e.g., they may primarily include parity bits), Thus, RV1 and RV2 are not self-decodable (e.g., it is generally not possible for a receiving device to decode the data using these bits alone). However, RV1 and RV 2 may be used for a retransmission (e.g., the retransmission may start at the beginning of RV 1 or RV 2), whereby the bits of the retransmission are combined at the receiver with the bits of the initial transmission.

The disclosure relates in some aspects to improving the reliability of a relayed packet (e.g., improving the coding gain for relayed transmissions) by allowing multiple UEs to jointly encode the same data transport block (TB). For example, TB encoding may be performed across relaying transmissions from different UEs, where the UEs are allocated the same slot for relaying the TB.

The disclosure relates in some aspects to decode and forward (DF) relaying, including joint and separate designs for joint relaying, grouping of UEs for the joint encoding, and different SCI designs for joint relaying (e.g., a single SCI design or multiple SCI designs for the UEs or a set or UEs). The same RV index or different RV indices may be used by different UEs in different designs. In some examples, a UE and DMRS may be associated for relaying operations (e.g., the data allocation for a given UE is transmitted with one or more dedicated DMRS symbols). In some examples, a time gap may be specified between the transmissions of UEs or sets of UEs. In some examples (e.g., where UEs are assigned common resource elements for relaying), a receiver that receives a jointly relayed transmission may combine least likelihood ratio (LLR) information that corresponds to common bits.

In some examples, joint encoding may be performed across the transmissions of two or more UEs. For example, two UEs may be assigned a joint allocation over specific time-frequency resource (e.g., an allocation including 8 OFDM symbols and 10 RBs). Both UEs can generate the circular buffer (e.g., as shown in FIG. 7) based on parameters allocated for a relaying operation including the total number of REs (#numRE), the total number of symbols (#numSymbols), and a specified MCS that may be fixed across both UEs. For example, a UE can calculate the size of the TB to be transmitted based on the parameter Ninfo (which relates to the systematic bits and is known from the source TB). The parameter Ninfo is equal to #numREs*#numSymbols*numLayers (the number of layers)*MCS_info. Here, MCS_info is the coding rate times the modulation order.

Upon receiving data to be relayed, a first UE (UE 1) may encode and transmit the specified number of REs (e.g., where the transmission based on a specified RV index, e.g., 0, 1, 2, or 3). Thus, the first UE will transmit a certain number of bits from the circular buffer. A second UE (UE 2) may continue encoding and transmitting the data bits starting from the location in the circular buffer where the first UE (UE 1) left off. As mentioned above, there may be redundancy in the data across these transmissions (e.g., depending on the RVs used).

Figure 8:
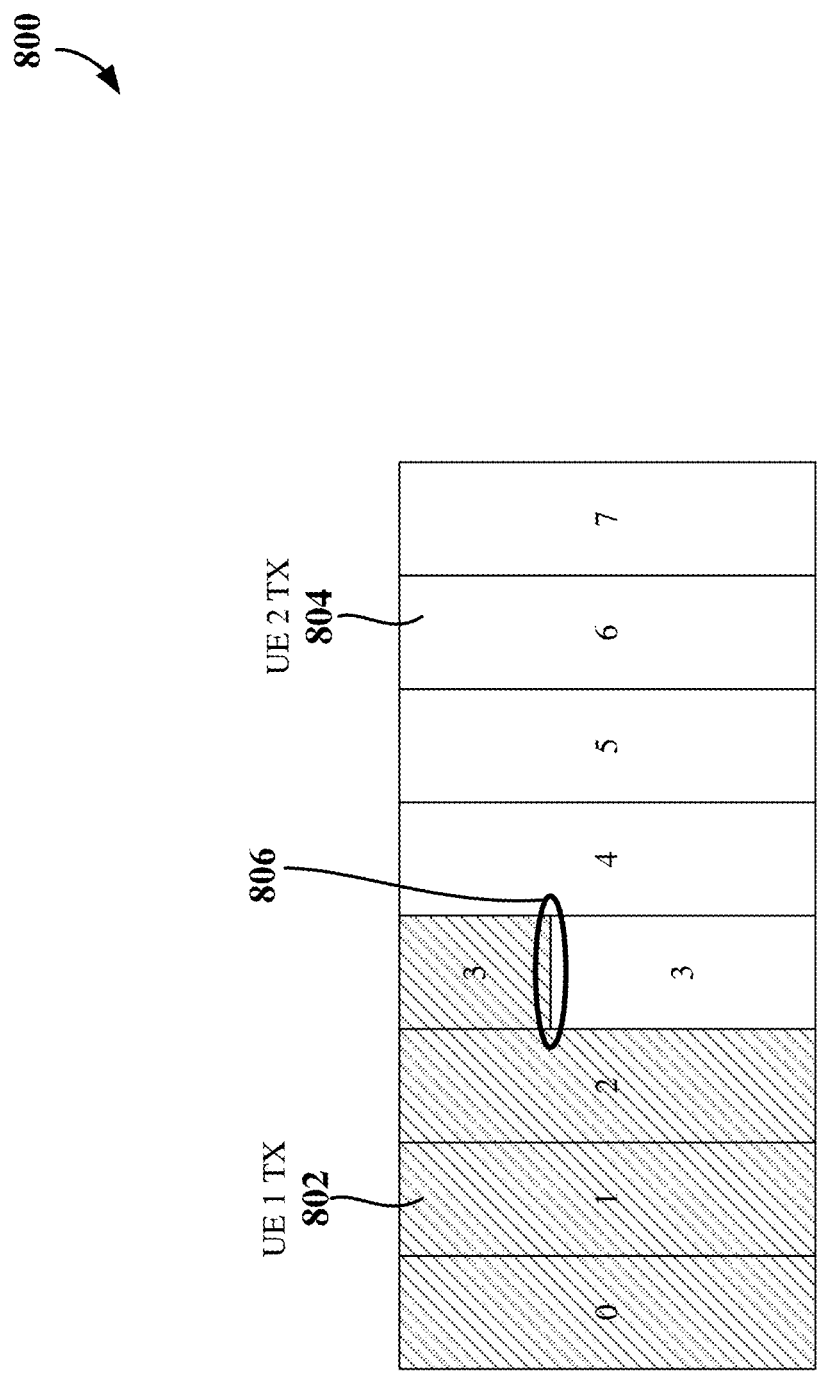
FIG. 8 is a conceptual illustration of an example of resource allocations in a slot that may be used for joint encoding across transmissions according to some aspects.

FIG. 8 is a conceptual illustration of an example of resource allocations in a slot that may be used for joint encoding across transmissions according to some aspects. UEs may be grouped to perform joint encoding, based on distance or other criteria, so that they can quickly handshake and share information. For example, a set of UEs that are within a certain distance of each other may be grouped for joint relaying operations. In some examples, a remote UE or a gNB can construct the groups. In some examples, the UEs may form a group and then signal to the gNB or remote UE that they have formed a group.

In FIG. 8, a first UE 802 transmits during a first portion (the shaded portion) of the 8 symbol slot and a second UE 804 transmits during a second portion (the unshaded portion) of the slot. The first UE 802 and the second UE 804 in the group will jointly encode the TB sent to a destination UE or gNB (if the UEs in the group are the last hop). As indicated by the oval 806 in FIG. 8, based on information (e.g., resource allocations, TBS, Ninfo, MCS, etc.) provided to the first UE 802 and the second UE 804, the second UE 804 may determine the location in the slot of the last RE used by the first UE 802 and determine where the encoding of the circular buffer by the first UE 802 left off. Thus, the second UE 804 may resume the encoding of the transport block at that location.

Figure 9:
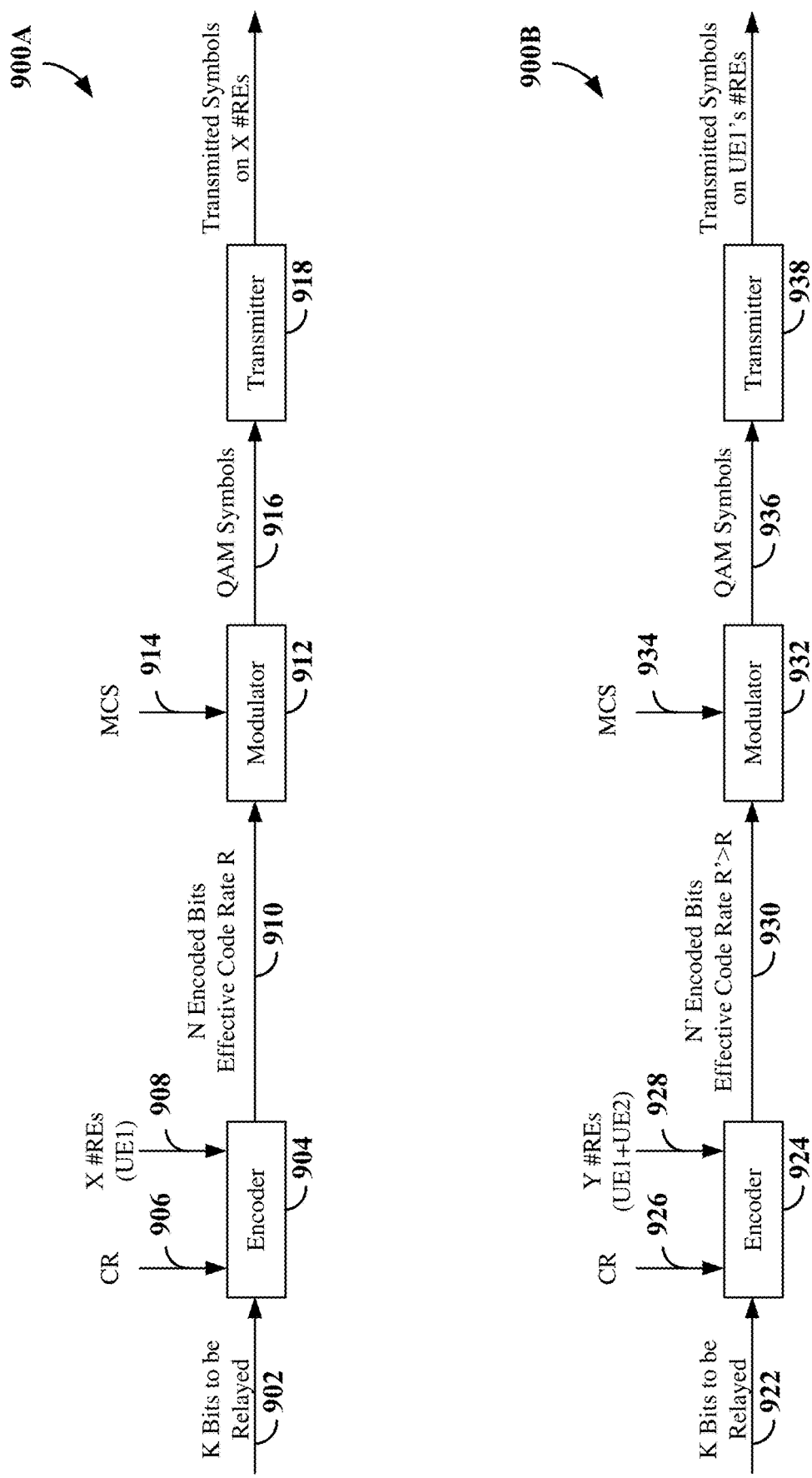
FIG. 9 is a conceptual illustration of examples of encoding according to some aspects.

In some aspects, the joint encoding scheme described above with reference to FIG. 8 may provide a lower effective coding rate than a scheme where multiple UEs (e.g., two UEs) independently relay data from a source UE. FIG. 9 illustrates these contrasting schemes in a first example 900A where a first UE (grouped with a second UE, not shown) independently encodes a set of bits from a source UE and in a second example 900B where a third UE jointly encodes a set of bits (in cooperation with a fourth UE, not shown) from a source UE.

In the first example 900A, the first UE and the second UE (not shown) are configured to independently relay data using the same sequence of encoded bits with the same RV index or with different RV indexes (where the RV index determines the starting bit of encoded bits to transmit). For example, as illustrated in the first example 900A, the first UE receives a set of K bits (e.g., x1, x2, . . . , xK uncoded bits) 902 to be relayed to another UE or to a base station. An encoder 904 encodes the set of K bits 902 based at least in part on a code rate (CR) 906 and a number of REs (X #REs) 908 specified for the first UE. The encoder 904 outputs a set of N encoded bits (e.g., g1, g2, . . . , gN encoded bits) 910 at an effective coding rate R that is based at least in part on the number of REs (X #REs) 908. A modulator 912 modulates the set of N encoded bits 910 based at least in part on a modulation order of a specified MCS 914 to generate a set of QAM symbols 916. A transmitter 918 transmits these symbols on the X #REs specified for the first UE.

In the second example 900B, the third UE that is grouped with the fourth UE (not shown) for joint relaying receives a set of K bits (e.g., x1, x2, . . . , xK uncoded bits) 922 to be relayed to another UE or to a base station. An encoder 924 encodes the set of K bits 922 based at least in part on a code rate (CR) 926 and the total number of REs (Y #REs) 928 specified across both the third UE and the fourth UE. The encoder 924 outputs a set of N' encoded bits (e.g., g1, g2, . . . , gN' encoded bits) 930 at an effective coding rate R' that is based at least in part on the total number of REs (Y #REs) 928. In this example, since there are more REs, the number N' of encoded bits 930 is larger than the number N of encoded bits 910 in the first example 900A. Thus, the effective coding rate R' is lower than the effective coding rate R in the first example 900A.

For example, as discussed above, Ninfo=number of REs (#REs)*modulation order (Mod_Order)*coding rate*number of layers (#Layers). Assuming a fixed Ninfo (e.g., since third and fourth UEs have the same TB/Ninfo) from a source UE, and a fixed number of data layers and modulation order (e.g., the same QAM is used) between the third and fourth UEs, increasing the number of REs (due to using the total number of REs across the two UEs for joint encoding) results in an effective coding rate that is lower than in the case (e.g., the first example 900A) when the number of REs is lower. Note that the effective coding rate (Coding_rate=Ninfo/(#REs*Mod_Order*#Layers)) referred to here is different from the coding rate associated with the MCS.

Referring again to FIG. 9, a modulator 932 modulates the set of N' encoded bits 930 based at least in part on a modulation order of a specified MCS 934 to generate a set of QAM symbols 936. A transmitter 938 transmits these symbols on the #REs specified for the second UE (e.g., a subset of the total number of Y #REs 928). For example, the first UE 802 of FIG. 8 may transmit these symbols on a first portion (the shaded portion) of a slot.

In some aspects, the joint encoding scheme described above with reference to FIG. 8 may provide a more reliable relaying operation than a relaying operation that only uses a single UE. In some cases, however, this may increase the relaying time since the relaying depends on both the first UE 802 and the second UE 804 completing their decoding and transmitting (e.g., a receiving device may need to wait to start its decoding until it receives the transmissions from both UEs).

A TB may be relayed over different interfaces in different scenarios. For example, a group of UEs may send a TB to another UE via a sidelink (e.g., PC5) interface. As another example, a group of UEs may send a TB to a gNB via a Uu interface.

Figure 10:
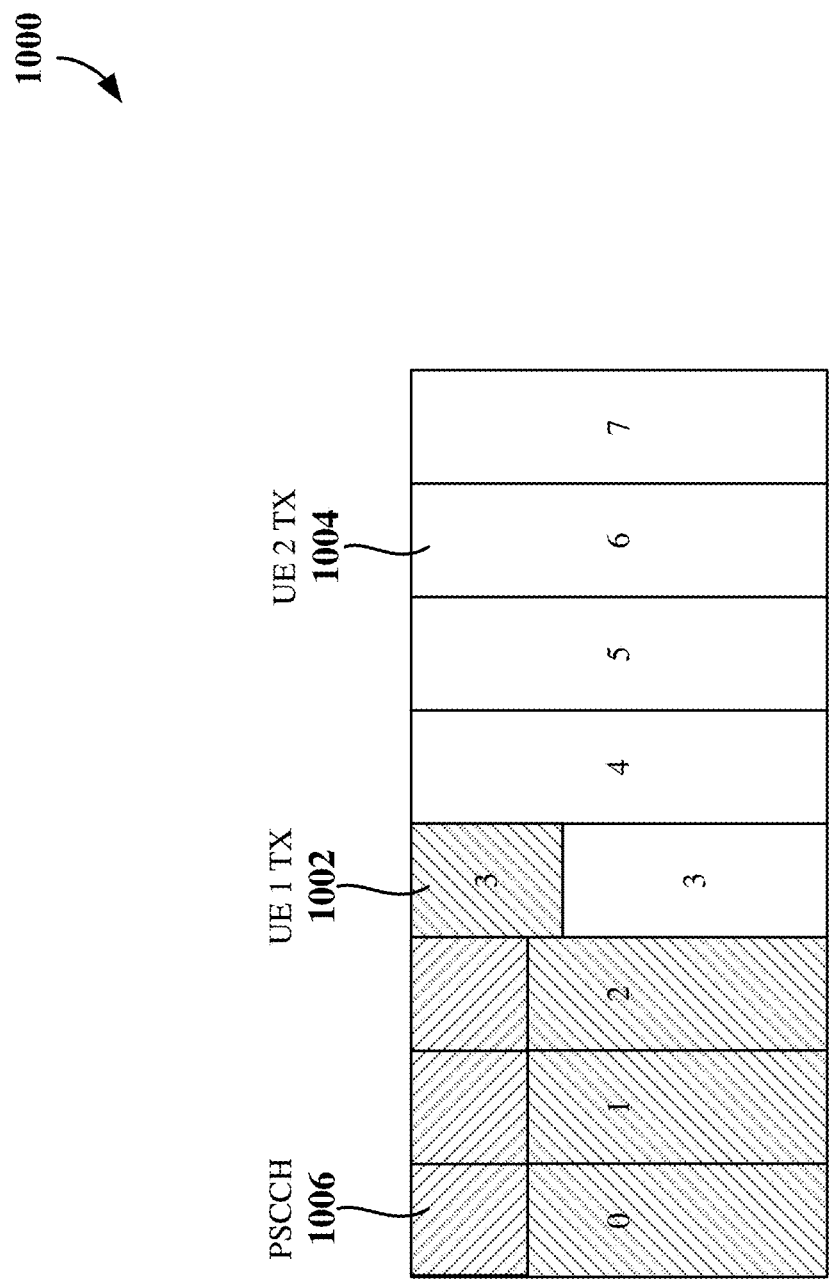
FIG. 10 is a conceptual illustration of an example of resource allocations in a slot including a control channel according to some aspects.

In examples where UEs relay data to another UE via a PC5 link, the entire transmission may be associated with a single SCI (with two SCI stages). FIG. 10 is a conceptual illustration of an example of resource allocations in a slot including a control channel (e.g., that carries SCI as discussed above) according to some aspects. In this example, the SCI contains information about the entire allocation as well as the applicable configurations (e.g., so that other UEs may determine that these resources are reserved). The first stage SCI of this single SCI may include the time domain resource allocation (TDRA) and DMRS information for each transmission by each UE. In the example of FIG. 10, a first UE 1002 transmits during a first portion of an 8 symbol slot and a second UE 1004 transmits during a second portion of the slot. In addition, the first UE 1002 transmits a PSCCH 1006 during the first portion of the slot.

In examples where UEs relay data to a gNB via a Uu link, the gNB may use a DCI to allocate PUSCH resources for the relaying, and the UEs may transmit PUSCH signals on those resource. A group common DCI may be used for the UEs or two DCIs could be used for each allocation part (for each UE) within a slot.

In some aspects, the joint encoding scheme described above with reference to FIGS. 8 and 10 may provide a more reliable relaying operation than a relaying operation that only uses a single UE (e.g., since the encoding processing capability may be doubled). In addition, this approach may provide a high coding gain since the joint encoding can be performed across all of the bits of the slot. In some cases, however, this approach may increase the relaying time since a device that receives the relayed data from the two UEs may need to wait to start its decoding until it receives the transmissions from both UEs.

An example of a joint encoding scheme that may provide a shorter decoding delay will be described with reference to FIG. 11. In this example, each UE may perform its own encoding on its allocated resources, thereby improving the relaying reliability since there is redundancy across the relaying transmissions. For example, given specified values for Ninfo and MCS_info, a first UE (UE 1) will encode its data using #numRE1 and #numSymbol1 and a second UE (UE 2) will encode its data using #numRE2 and #numSymbol2. In this case, a device that receives the relayed data from the two UEs may be able to start decoding the data from the first UE as soon as the first UE completes its transmission (without waiting for the transmission from the second UE). Thus, the decoding delay associated with this example may be lower than in the examples described above with reference to FIGS. 8 and 10. The decoding gain may be lower in this case, however, since the encoding by a given UE is across a subset of the bits of the slot.

In some scenarios, the transmission from the first UE will be fully decodable (e.g., CRC passes based on this transmission alone). Thus, the receiving device may recover the TB based solely on the transmission from the first UE. Accordingly, this approach may significantly reduce the decoding delay in these scenarios.

In scenarios where the transmission from the first UE is not fully decodable, the receiving device may attempt to combine the data bits received from each UE in the LLR domain Since the possibility that both transmissions will be severely compromised is likely to be low, this approach may still provide higher reliability than an approach that only uses a single relay.

Figure 11:
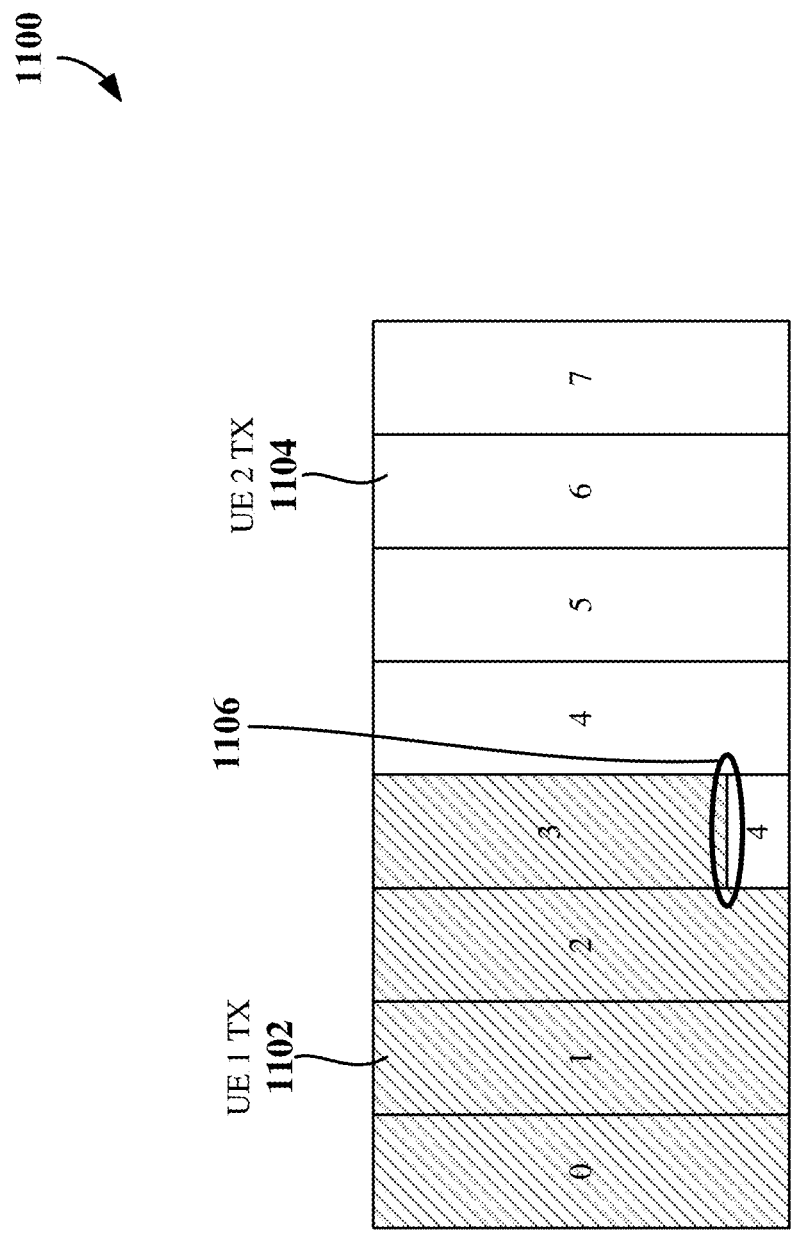
FIG. 11 is a conceptual illustration of an example of different resource allocations in a slot that may be used for independent encoding according to some aspects.

FIG. 11 is a conceptual illustration of an example of different resource allocations in a slot that may be used for independent encoding according to some aspects. A first UE 1102 transmits during a first portion (the shaded portion) of an 8 symbol slot and a second UE 1104 transmits during a second portion (the unshaded portion) of the slot. As indicated by the oval 1106 in FIG. 11, based on information (e.g., resource allocations, MCS, etc.) provided to the first UE 1102 and the second UE 1104, the second UE 1104 may determine the location in the slot of the last RE used by the first UE 1102 (e.g., the location where the first UE 1102 finished its encoding and transmitting). The second UE 1104 may then start its encoding of the transport block at that location. Here, the second UE 1104 may start to transmit based on its RV, without regard to the encoding of the first UE 1102. For example, if the first UE 1102 is assigned RV0 and the second UE 1104 is assigned RV3, the first UE 1102 may start its transmission based on RV0 and continue transmitting until its allocated number of REs is reached. The second UE 1104 may then start its transmission based on RV3 and continue transmitting until its allocated number of REs is reached.

Figure 12:
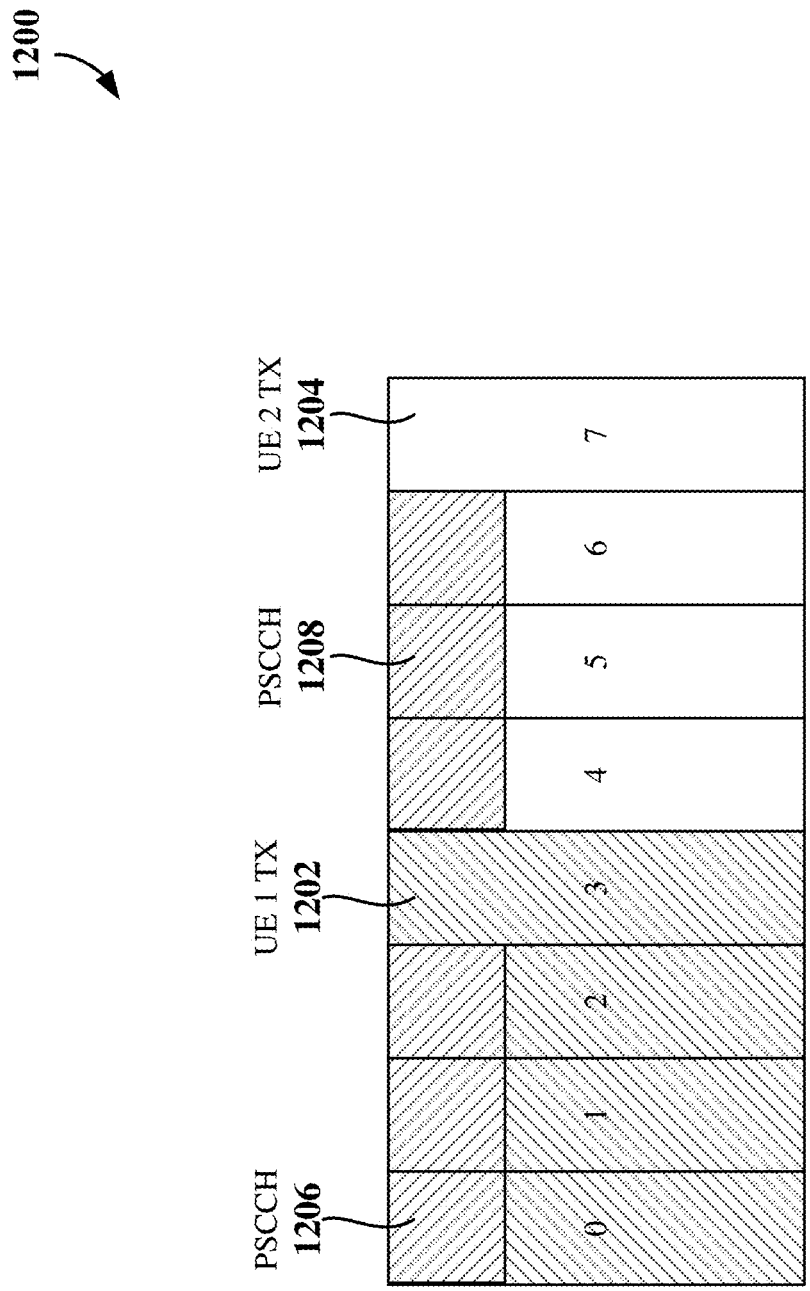
FIG. 12 is a conceptual illustration of an example of different resource allocations in a slot and associated control channels according to some aspects.

Different SCI designs may be used in different examples. In a first example, each transmission can have its own SCI (e.g., 2 SCIs may be transmitted), where a given SCI indicates the resources for that transmission. FIG. 12 is a conceptual illustration of an example of different resource allocations in a slot and associated control channels according to some aspects. A first UE 1202 transmits during a first portion (symbols 0-3) of an 8 symbol slot and a second UE 1204 transmits during a second portion (symbols 4-7) of the slot. In addition, the first UE 1202 transmits a PSCCH 1206 include an SCI during the first portion (e.g., during parts of symbols 0-2) of the slot and the second UE 1204 transmits a PSCCH 1208 including an SCI in the second portion (e.g., during parts of symbols 4-6) of the slot.

In a second example, two SCIs are sent as in the first example. In addition, the SCI 1 part of the SCI (e.g., as discussed above) may indicate the resources for that transmission or for the entire relay group (e.g., the resources for the transmission by the first UE 1202 and the resources for the transmission by the second UE 1204).

In some aspects, the use of two SCIs may enable each transmission to be self-decodable at a receiving device. In this way, if one relay transmission is lost, the other relay transmission may still be self-decodable at the receiving device.

Figure 13:
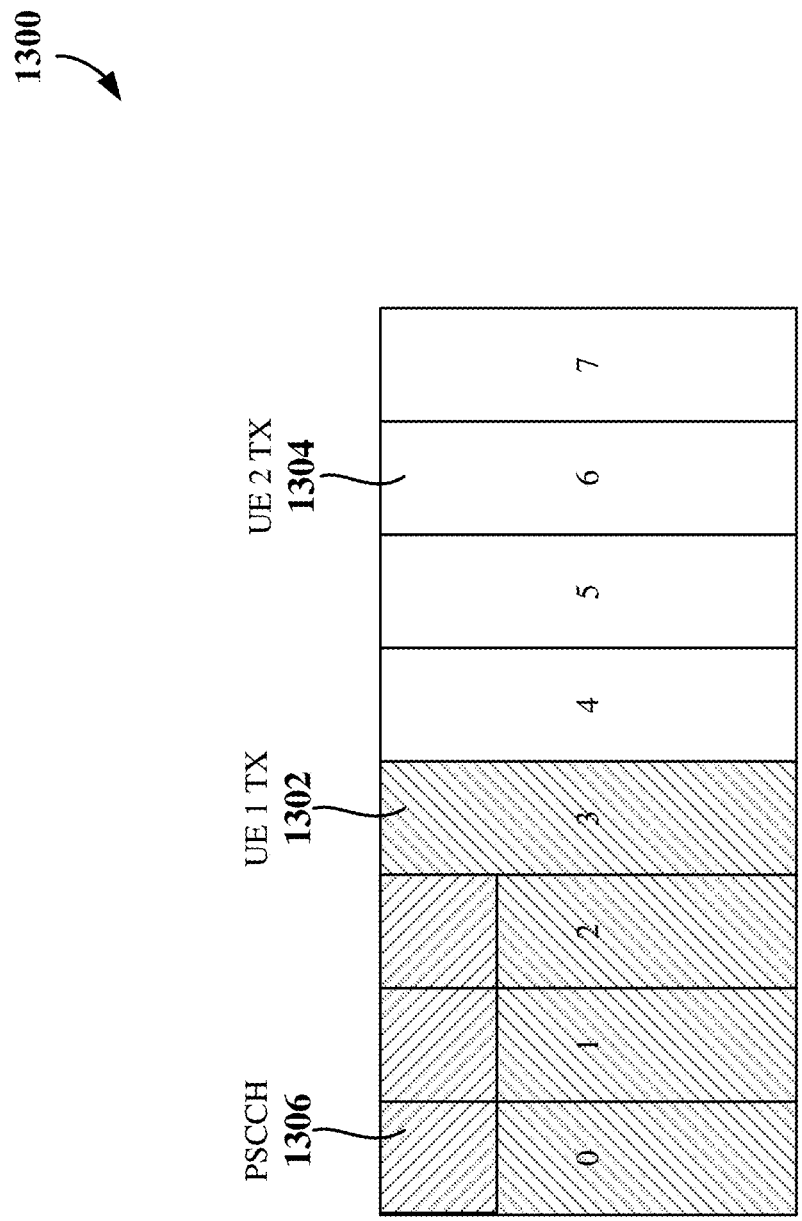
FIG. 13 is a conceptual illustration of another example of resource allocations in a slot including a control channel according to some aspects.

In a third example, a single SCI can be used to configure both relay transmissions, where the SCI is sent by the first UE. FIG. 13 is a conceptual illustration of resource allocations in a slot including a single control channel according to some aspects. In the example of FIG. 13, a first UE 1302 transmits during a first portion (symbols 0-3) of an 8 symbol slot and a second UE 1304 transmits during a second portion (symbols 4-7) of the slot. In addition, the first UE 1302 transmits a PSCCH 1306 including the SCI during the first portion of the slot, but the second UE 1304 does not transmit a PSCCH in the second portion of the slot. On this example, the single SCI may indicate the resources for the entire relay group (e.g., the resources for the transmission by the first UE 1302 and the resources for the transmission by the second UE 1304).

Figure 14:
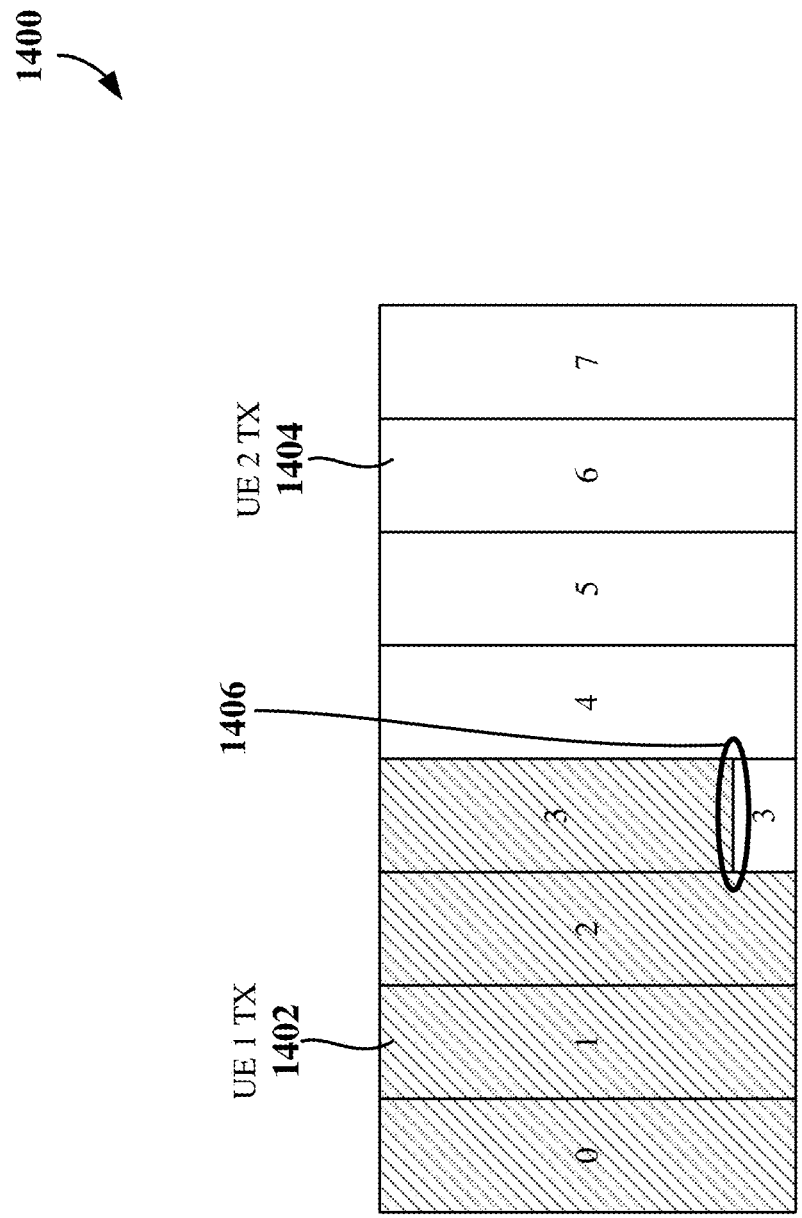
FIG. 14 is a conceptual illustration of an example of resource usage in a slot according to some aspects.

FIG. 14 is a conceptual illustration of another example of resource usage in a slot according to some aspects. A first UE

1402 may be configured (e.g., ordered or instructed) to fill a slot (the time/frequency) allocation until a designated portion of a TB is transmitted. In addition, a second UE 1404 may relay its data over the remaining resources. In this approach, a group of UEs (the first UE 1402 and the second UE 1404 in the example of FIG. 14) is assigned a set of resources, then based on a specified order, the UEs of the group transmit one by one until the relaying of the TB is complete.

In some examples, the designated portion of the TB mentioned above may be specified as a configured factor α. For example, a given UE may be configured to transmit αTB (or αRV).

In some examples, the time-domain allocation (or symbol allocation) is determined as follows. A source UE (or gNB) will allocate Z symbols for the group of UEs (the first UE 1402 and the second UE 1404 in the example of FIG. 14) and specify an order of transmission (e.g., configured by RRC/MAC-CE or DCI/SCI). The first UE 1402 will start to use the REs of the slot until it finishes its RV. Once the first UE 1402 is done, the second UE 1404 will start to use the remaining REs of the slot until its RV is finished or the REs of the slot are used. In some examples, the order may be based on a channel quality or transmit power levels at the first UE 1402 and the second UE 1404 so that the UE with better quality or higher transmit power may be the first to transmit (use the resources). In some scenarios, the first UE 1402 could use the entire slot for its transmission (e.g., if the coding gain is low).

In the example of FIG. 14, the first UE 1402 transmits during a first portion (the shaded portion) of an 8 symbol slot and the second UE 1404 transmits during a second portion (the unshaded portion) of slot. As indicated by the oval 1406 in FIG. 14, based on information (e.g., resource allocations, MCS, etc.) provided to the first UE 1402 and the second UE 1404, the second UE 1404 may determine the location in the slot of the last RE used by the first UE 1402 (e.g., where the first UE 1402 finished its encoding and transmitting of its entire TB or αTB). The second UE 1404 may then start its encoding of its transport block at that location and continue until the slot is full.

Two alternative SCI designs may be used in this case as well. In a first example, each transmission can have its own SCI. In a second example, a single SCI can be used to configure both relay transmissions. In the second example, the SCI is sent by the first UE. In some aspects, the use of two SCIs may enable each transmission to be self-decodable at a receiving device, so that if the transmission of one UE is lost, the other transmission may still be self-decodable at the receiving device.

In the above examples, the second UE may be allocated a relatively small portion an OFDM symbol. In some scenarios, this may create transmission issues (e.g., a power amplifier might not be able to effectively transmit a small portion of a symbol due to phase changes, etc.).

In some examples, to avoid a small allocation of an OFDM symbol, each UE may be allocated a full OFDM symbol. For example, a source UE or gNB may allocate X symbols to UE 1 and Y symbols to UE 2. In some examples, X and Y may be configured by an RRC message, a MAC-CE, a DCI, or an SCI.

For the complete TB-based transmission scheme (e.g., as discussed above in conjunction with FIG. 14) where there is no explicit indication of which symbols are for which UE, a group of UEs may first be assigned time and frequency resources. Then, if a first UE finishes its RV before it finishes a symbol, the first UE may take one or two actions. In a first option, the first UE may repeat part of its QAM data to finish the symbol (i.e., if the first UE started a symbol, the first UE would finish it). In a second option, the first UE does not use the remaining part of the symbol entirely.

If the allocations are configured by an RRC message or an MAC-CE, in a subsequent SCI or DCI, the source UE or gNB may assign a start and length indicator value (SLIV). In this case, each UE may use a fraction of the resources indicated by the SLIV based on X and Y. Alternatively, the allocations for each UE may be explicit.

Figure 15:
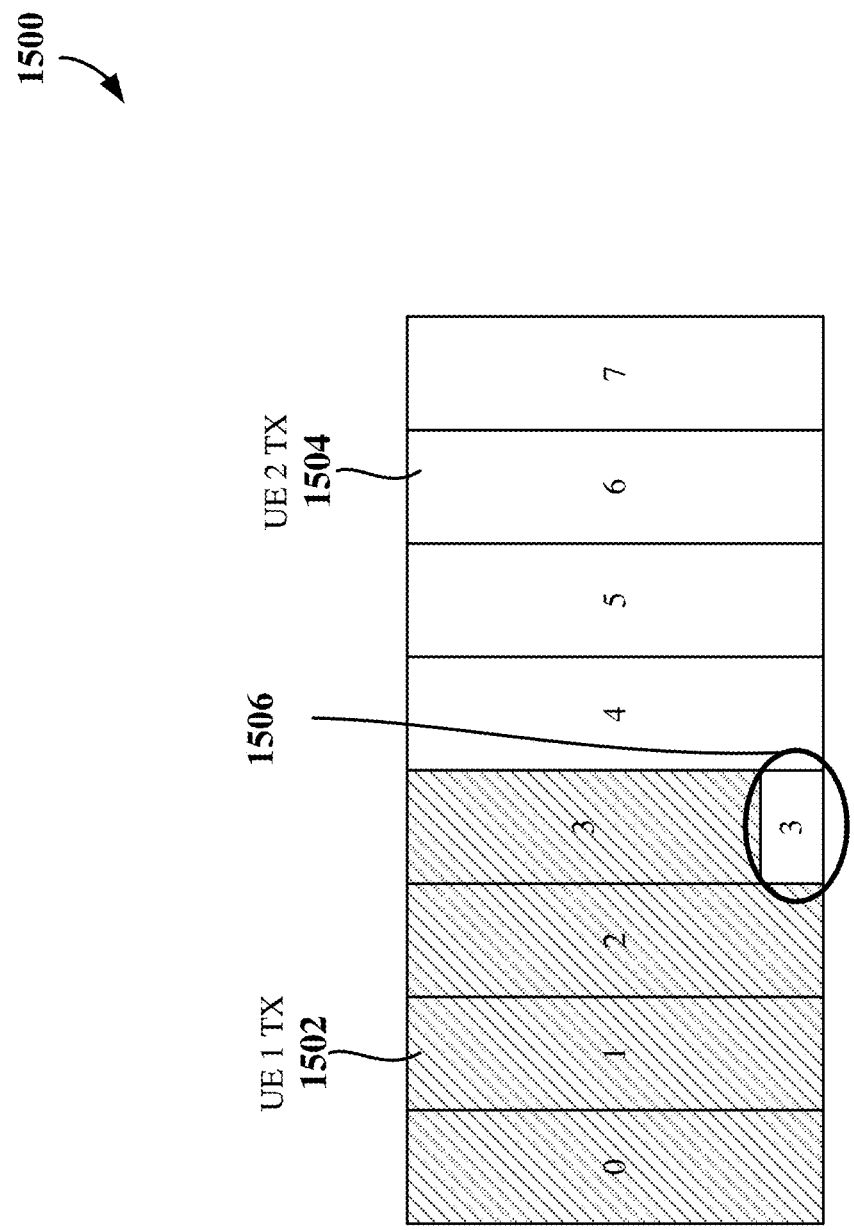
FIG. 15 is a conceptual illustration of an example of full symbols allocations in a slot according to some aspects.

FIG. 15 is a conceptual illustration of an example of full symbols allocations in a slot according to some aspects. A first UE 1502 is allocated a first portion (slots 0-3) of an 8 symbol slot and a second UE 1504 is allocated a second portion (slots 4-7) of the slot. As indicated by the oval 1506 in FIG. 15 (e.g., showing a part of symbol 3), the first UE 1502 may repeat data in this part of symbol 3 or not transmit during this part of symbol 3.

In some examples, each UE can use a different modulation order. For example, the modulation order used by each UE may be based on an agreement with a gNB and/or other UEs. In some examples, the modulation order to be used may be indicated to the UE. Given a fixed Ninfo parameter and TBS, an increase of the modulation order would allow a UE to transmit most of the TB during its relaying transmission. Thus, the remaining REs in the slot may be used by other UEs to send transmissions. The modulation order or other information can be configured based on signaling received by a UE. Alternatively, a UE may, based on its CSI history, reduce its MCS to use a lower modulation order and then signal that lower MCS to a receiving device via an SCI.

In some examples, each UE may start its resource assignment from a DMRS symbol. In some examples, such a configuration may be signaled to a UE by the source UE or gNB when allocating the relay resources. In some examples (e.g., when there are multiple DMRSs), each UE may be assigned one DMRS and each UE may start to distribute its QAM data accordingly. Here, symbol numbers may be ordered to distribute the data of an RV, and each UE may take one DMRS. For example, one symbol may be designated for UE 1 (and blank for UE 2) and another symbol may be designated for UE 2 (and blank for UE 1), etc.

Figure 16:
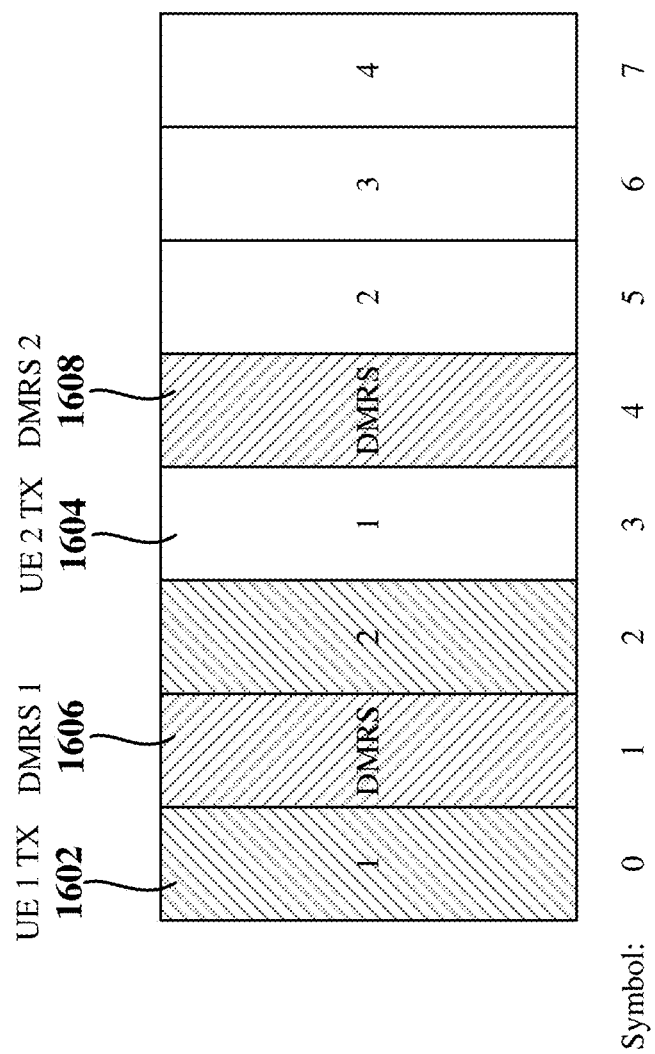
FIG. 16 is a conceptual illustration of an example of resource allocations in a slot including allocations for demodulation reference signals according to some aspects.

FIG. 16 is a conceptual illustration of an example of resource allocations in a slot including allocations for demodulation reference signals according to some aspects. A first UE 1602 transmits during a first portion (slots 0 and 2) of an 8 symbol slot and a second UE 1604 transmits during a second portion (slots 3, 5, 6, and 7) of the slot. Here, the transmission by the first UE 1602 is associated with a first DMRS 1606 in the slot. In addition, the transmission by the second UE 1604 is associated with a second DMRS 1608 in the slot.

The disclosure relates in some aspects to using a configured grant (CG) to configure joint relaying. For example, to avoid using many DCI transmissions for joint relaying and to use DMRS appropriately, a gNB can allocate configured grants to each group of UEs to relay data. Here, the allocation of each UE may be specified and each UE may have its own specific DMRS symbols. The time domain resource allocation (TDRA) and frequency domain resource allocation of each UE may be given as part of the CG configuration using an index assigned to each UE. Since these allocations may therefore be known beforehand, no extra signaling may be needed for these allocations.

In some examples, a gap may be configured between relay transmissions. For example, a gNB or source UE may configure a gap between the transmissions from a group of UEs (e.g., between two UEs per group in some examples).

In some examples, the gNB or source UE may allocate one or multiple symbols to be common symbols that may be used by multiple UEs to allow for combining. Here, the same RV index may be used by the UEs to allow for combining of the signal in the power domain which may improve the LLR operation at the receiving device.

Figure 17:
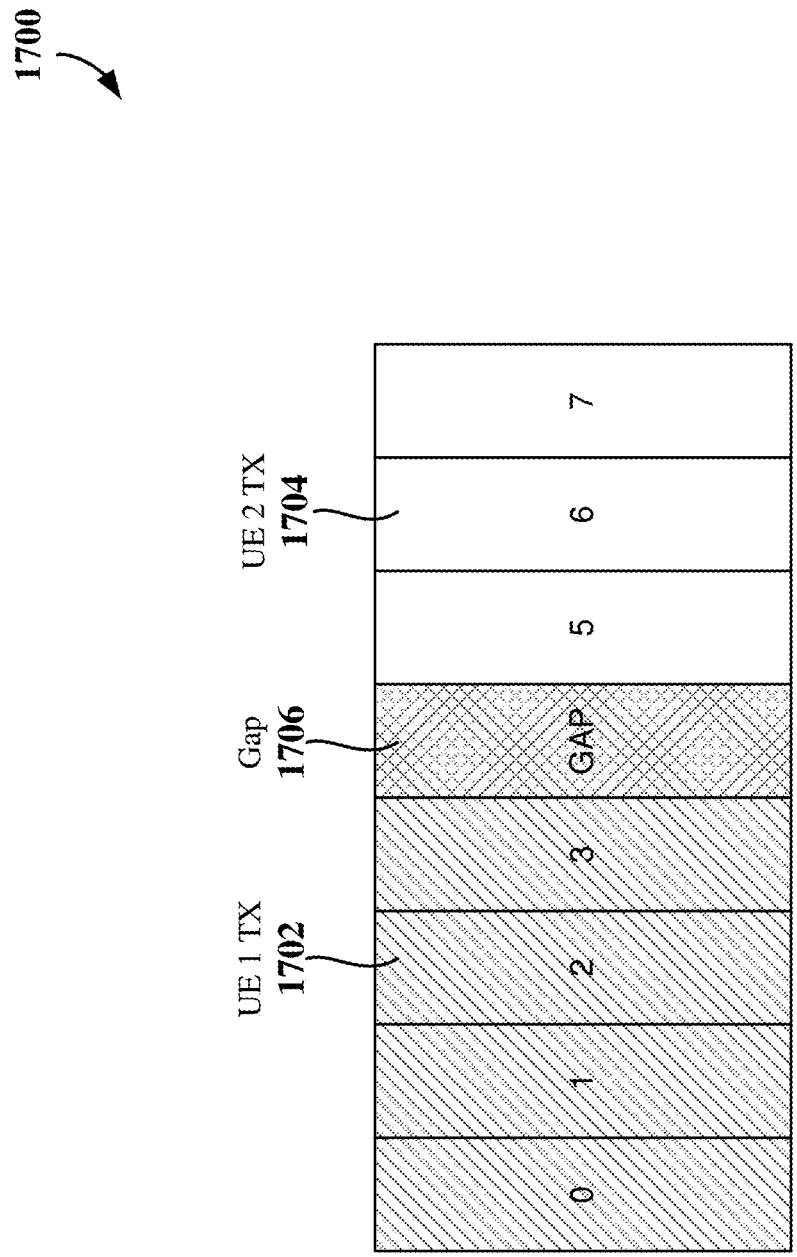
FIG. 17 is a conceptual illustration of an example of resource allocations separated by a gap in a slot according to some aspects.

FIG. 17 is a conceptual illustration of an example of resource allocations separated by a gap in a slot according to some aspects. A first UE 1702 transmits during a first portion (slots 0-3) of an 8 symbol slot and a second UE 1704 transmits during a second portion (slot 5-7) of the slot. Here, the transmission by the first UE 1702 is separated in time from the transmission by the second UE 1704 by a gap 1706 in symbol 4 of the slot.

Figure 18:
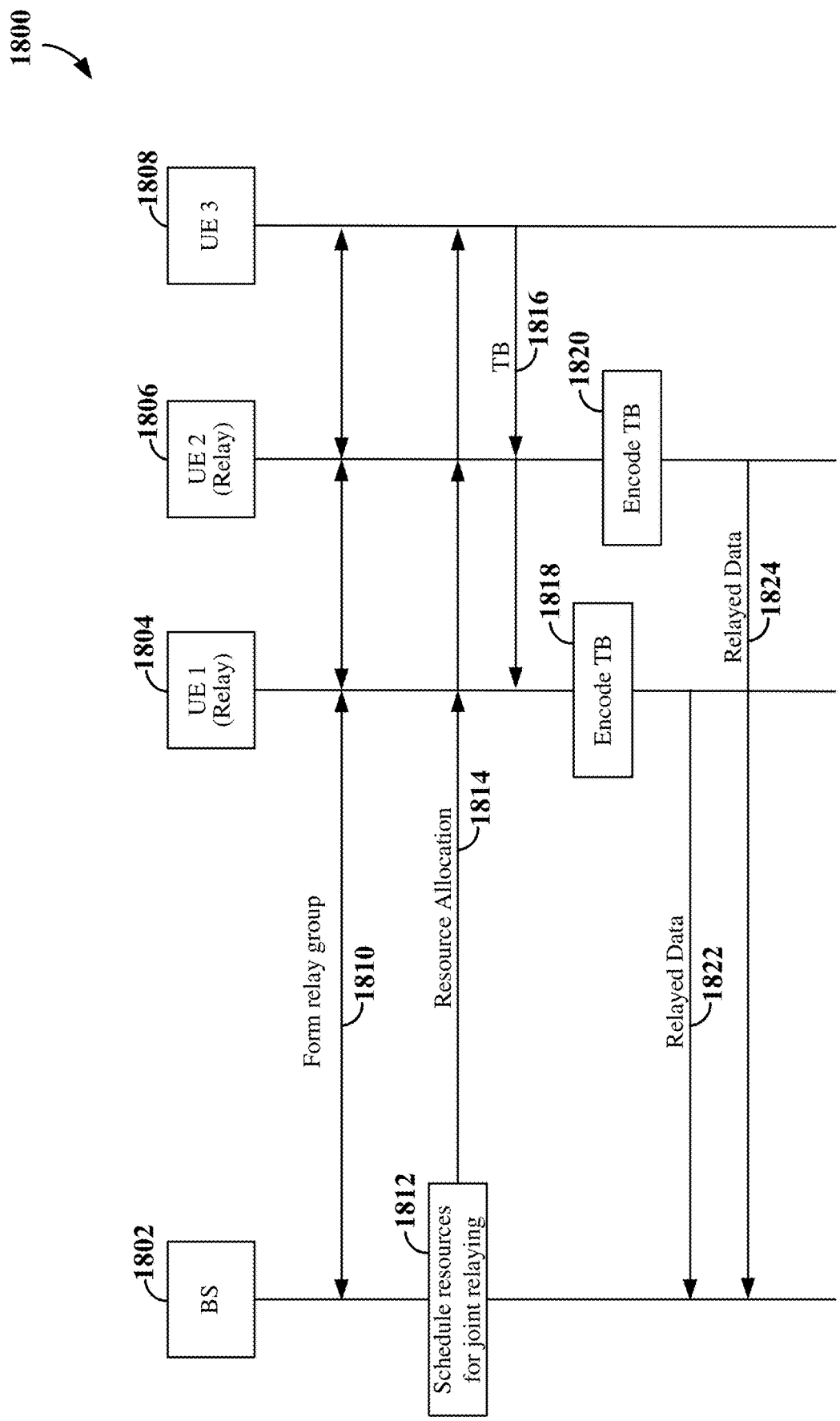
FIG. 18 is a signaling diagram illustrating an example of signaling for jointly relaying a transport block to a base station according to some aspects.

FIG. 18 is a signaling diagram illustrating an example of signaling between a base station (BS) 1802 and UEs 1804, 1806, and 1808 (e.g., sidelink devices) that may be used in conjunction with jointly relaying a TB. In some examples, the links between the UE 1808 and the UEs 1804 and 1806 may be sidelinks. In some examples, the links between the UE 1808 and the UEs 1804 and 1806 (e.g., smart repeaters) may be Uu links. The UEs 1804, 1806, and 1808 may correspond to any of the UEs, sidelink devices, D2D devices, V2X devices, or scheduled entities shown in any of FIGS. 1, 3, 4, 6, 19, 20, and 22. The base station 1802 may correspond to any of the base stations or scheduling entities shown in any of FIGS. 1, 3, 4, 6, and 22.

At 1810 of FIG. 18, the BS 1802 and the UEs 1804, 1806, and 1808 may cooperate to form a relay group. For example, BS 1802 may select a relay group and inform the UEs 1804, 1806, and 1808 of the formation of the relay group. As another example, the UEs 1804 and 1806 may form a relay group and inform the BS 1802 and the UE 1808 of the formation of the relay group.

At 1812, the BS 1802 schedules resources for a joint relay operation by the UE 1804 and the UE 1806. The BS 1802 then transmits an indication of the resource allocation for the joint relay operation to the UEs 1804, 1806, and 1808.

At 1816, the UE 1808 transmits a TB to the UE 1804 and the UE 1806 (e.g., on a resource scheduled by the BS 1802 at 1812).

At 1818, the UE 1804 encodes at least a portion of the TB (e.g., using one of the options discussed above). In addition, at 1820, the UE 1806 encodes at least a portion of the TB (e.g., using one of the options discussed above).

At 1822, the UE 1804 transmits its encoded data during a first portion of a slot that has been allocated for the joint relaying operation (e.g., on a resource scheduled by the BS 1802). In addition, at 1824, the UE 1806 transmits its encoded data during a second portion of that same slot. As discussed above, the UE 1806 may complete the encoding started by the UE 1804 or each of the UE 1804 and the UE 1806 may independently encode its data.

Figure 19:
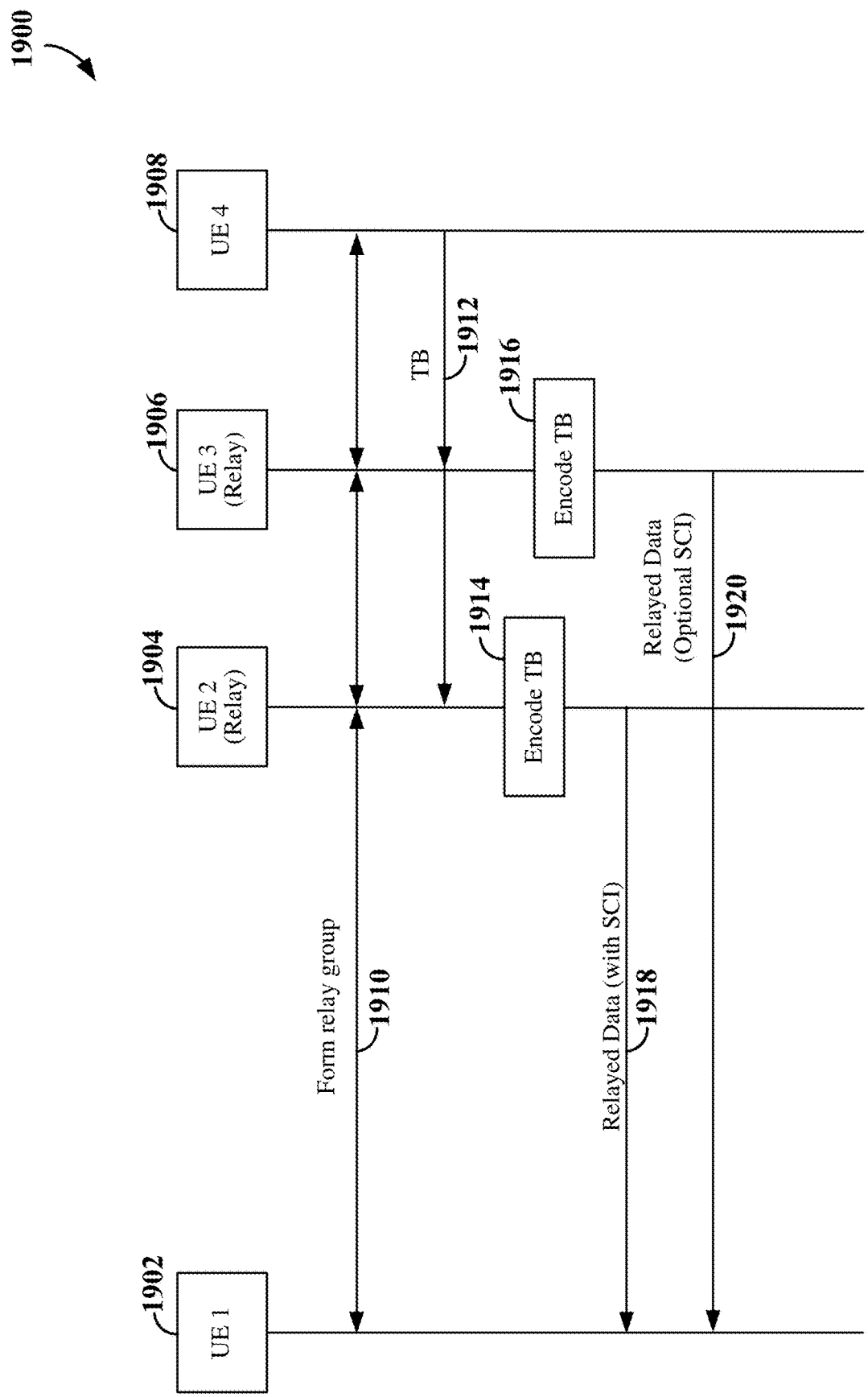
FIG. 19 is a signaling diagram illustrating an example of signaling for jointly relaying a transport block to a user equipment according to some aspects.

FIG. 19 is a signaling diagram illustrating an example of signaling between UEs 1902, 1904, 1906, and 1908 (e.g., sidelink devices) that may be used in conjunction with jointly relaying a TB. In some examples, the links between the UE 1908 and the UEs 1904 and 1906 may be sidelinks. In some examples, the links between the UE 1908 and the UEs 1904 and 1906 (e.g., smart repeaters) may be Uu links. In some examples, the links between the UE 1902 and the UEs 1904 and 1906 may be sidelinks. In some examples, the links between the UE 1902 and the UEs 1904 and 1906 (e.g., smart repeaters) may be Uu links. The UEs 1902, 1904, 1906, and 1908 may correspond to any of the UEs, sidelink devices, D2D devices, V2X devices, wireless communication devices, or scheduled entities shown in any of FIGS. 1, 3, 4, 6, 18, 20, and 22.

At 1910 of FIG. 19, the UEs 1902, 1904, 1906, and 1908 may cooperate to form a relay group. For example, the UEs 1904 and 1906 may form a relay group and inform the UEs 1902 and 1908 of the formation of the relay group.

At 1912, based on scheduling by a base station or a sidelink UE (not shown), the UE 1908 transmits a TB to the UE 1904 and the UE 1906.

At 1914, the UE 1904 encodes at least a portion of the TB (e.g., using one of the options discussed above). In addition, at 1916, the UE 1906 encodes at least a portion of the TB (e.g., using one of the options discussed above).

At 1918, the UE 1904 transmits its encoded data during a first portion of a slot that has been allocated for the joint relaying operation. In addition, at 1920, the UE 1906 transmits its encoded data during a second portion of a slot that that has been allocated for the joint relaying operation. As discussed above, the UE 1906 may complete the encoding started by the UE 1904 or each of the UE 1904 and the UE 1906 may independent encode is data.

Figure 20:
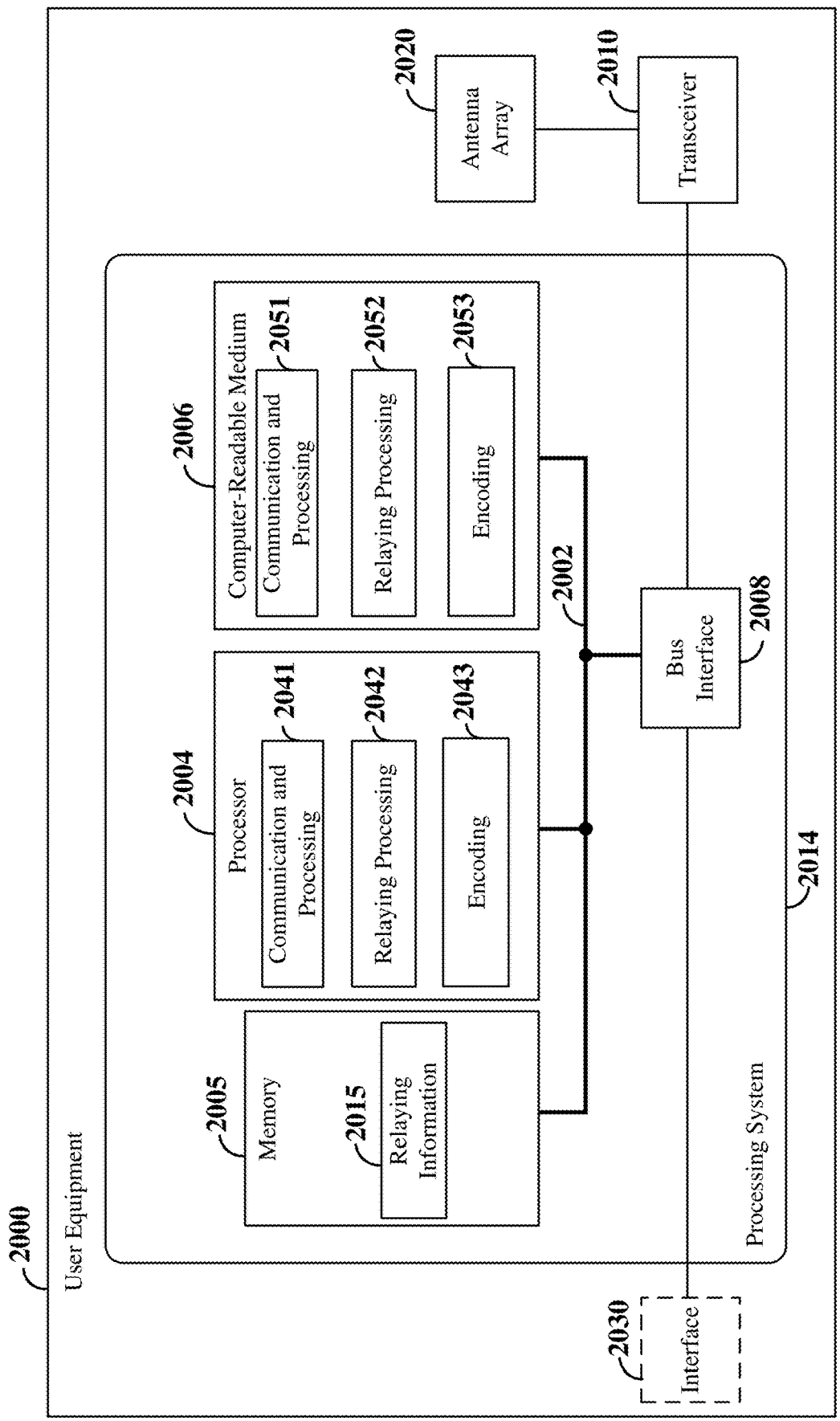
FIG. 20 is a block diagram illustrating an example of a hardware implementation for a user equipment employing a processing system according to some aspects.

FIG. 20 is a conceptual diagram illustrating an example of a hardware implementation for a user equipment 2000 employing a processing system 2014. For example, the user equipment 2000 may be a UE, a sidelink device, a D2D device, a V2X device, or a scheduled entity as illustrated in any of FIGS. 1, 3, 4, 6, 18, and 19.

In accordance with various aspects of the disclosure, an element, or any portion of an element, or any combination of elements may be implemented with the processing system 2014. The processing system 2014 may include one or more processors 2004. Examples of processors 2004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the user equipment 2000 may be configured to perform any one or more of the functions described herein. That is, the processor 2004, as utilized in a user equipment 2000, may be used to implement any one or more of the methods described herein.

The processor 2004 may in some instances be implemented via a baseband or modem chip and in other implementations, the processor 2004 may itself include a number of devices distinct and different from a baseband or modem chip (e.g., in such scenarios these devices may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 2014 may be implemented with a bus architecture, represented generally by the bus 2002. The bus 2002 may include any number of interconnecting buses and bridges depending on the specific application of the processing system 2014 and the overall design constraints. The bus 2002 communicatively couples together various circuits including one or more processors (represented generally by the processor 2004), a memory 2005, and computer-readable media (represented generally by the computer-readable medium 2006). The bus 2002 may also link various other circuits such as timing sources, peripherals, voltage regulators, and power management circuits, which are well known in the art, and therefore, will not be described any further. A bus interface 2008 provides an interface between the bus 2002 and a transceiver 2010 and an antenna array 2020 and between the bus 2002 and an interface 2030. The transceiver 2010 provides a means for communicating with various other apparatus over a transmission medium (e.g., air interface). The interface 2030 provides a communication interface or means of communicating with various other apparatuses and devices (e.g., other devices housed within the same apparatus as the user equipment 2000 or other external apparatuses) over an internal bus or external transmission medium. Depending upon the nature of the user equipment 2000, the interface 2030 may include a user interface (e.g., keypad, display, speaker, microphone, joystick). Of course, such a user interface is optional, and may be omitted in some examples, such as an IoT device.

The processor 2004 is responsible for managing the bus 2002 and general processing, including the execution of software stored on the computer-readable medium 2006. The software, when executed by the processor 2004, causes the processing system 2014 to perform the various functions described below for any particular apparatus. The computer-readable medium 2006 and the memory 2005 may also be used for storing data that is manipulated by the processor 2004 when executing software. For example, the memory 2005 may store relaying information 2015 (e.g., relay parameters) used by the processor 2004 in cooperation with the transceiver 2010 to control relaying operations as described herein.

One or more processors 2004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 2006.

The computer-readable medium 2006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 2006 may reside in the processing system 2014, external to the processing system 2014, or distributed across multiple entities including the processing system 2014. The computer-readable medium 2006 may be embodied in a computer program product. In some examples, the computer-readable medium 2006 may be part of the memory 2005. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 2004 may include circuitry configured for various functions. In some aspects, processor 2004 may include circuitry for performing one or more of the operations described herein with respect to FIGS. 7-18 and 21.

The processor 2004 may include communication and processing circuitry 2041, configured to communicate with a base station and one or more other wireless communication devices over a common carrier shared between a cellular (e.g., Uu) interface and a sidelink (e.g., PC5) interface. In some examples, the communication and processing circuitry 2041 may include one or more hardware components that provide the physical structure that performs processes related to wireless communication (e.g., signal reception and/or signal transmission) and signal processing (e.g., processing a received signal and/or processing a signal for transmission). The communication and processing circuitry 2041 may further be configured to execute communication and processing software 2051 stored on the computer-readable medium 2006 to implement one or more functions described herein.

In some implementations where the communication involves receiving information, the communication and processing circuitry 2041 may obtain information from a component of the user equipment 2000 (e.g., from the transceiver 2010 that receives the information via radio frequency signaling or some other type of signaling suitable for the applicable communication medium), process (e.g., decode) the information, and output the processed information. For example, the communication and processing circuitry 2041 may output the information to another component of the processor 2004, to the memory 2005, or to the bus interface 2008. In some examples, the communication and processing circuitry 2041 may receive one or more of signals, messages, SCIs, feedback, other information, or any combination thereof. In some examples, the communication and processing circuitry 2041 may receive information via one or more of a PSCCH, a PSSCH, a PSFCH, some other type of channel, or any combination thereof. In some examples, the communication and processing circuitry 2041 may include functionality for a means for receiving (e.g., means for receiving a signal and/or means for receiving control information). In some examples, the communication and processing circuitry 2041 may include functionality for a means for decoding.

In some implementations where the communication involves sending (e.g., transmitting) information, the communication and processing circuitry 2041 may obtain information (e.g., from another component of the processor 2004, the memory 2005, or the bus interface 2008), process (e.g., encode) the information, and output the processed information. For example, the communication and processing circuitry 2041 may output the information to the transceiver 2010 (e.g., that transmits the information via radio frequency signaling or some other type of signaling suitable for the applicable communication medium). In some examples, the communication and processing circuitry 2041 may send one or more of signals, messages, SCIs, feedback, other information, or any combination thereof. In some examples, the communication and processing circuitry 2041 may send information via one or more of a PSCCH, a PSSCH, a PSFCH, some other type of channel, or any combination thereof. In some examples, the communication and processing circuitry 2041 may include functionality for a means for sending (e.g., means for transmitting). In some examples, the communication and processing circuitry 2041 may include functionality for a means for encoding.

The processor 2004 may further include relaying processing circuitry 2042, configured to perform one or more of the relaying processing-related operations described herein (e.g., including those described in conjunction with FIGS. 7-19). In some examples, the relaying processing circuitry 2042 may include functionality for a means for determining that multiple UEs are to jointly relay a transport block. For example, the relaying processing circuitry 2042 may be configured to form a relaying group as discussed herein in conjunction with FIG. 18 and/or FIG. 19. In some examples, the relaying processing circuitry 2042 may include functionality for a means for receiving a transport block or other data. For example, the relaying processing circuitry 2042 may be configured to receive a set of bits as discussed herein in conjunction with any of FIGS. 7, 9, 18, and FIG. 19. In some examples, the relaying processing circuitry 2042 may include functionality for a means for receiving an indication of a quantity of resource elements within the slot to be encoded by the user equipment. For example, the relaying processing circuitry 2042 may be configured to receive RE information (e.g., #REs) as discussed herein in conjunction with any of FIGS. 9, 18, and FIG. 19. In some examples, the relaying processing circuitry 2042 may include functionality for a means for receiving downlink control information that indicates resources to be used by the first user equipment to transmit the first encoded data. For example, the relaying processing circuitry 2042 may be configured to receive resource allocation information as discussed herein in conjunction with FIG. 18 and/or FIG. 19. In some examples, the relaying processing circuitry 2042 may include functionality for a means for receiving an indication of a quantity of resource elements and a quantity of symbols within the slot to be encoded by the user equipment. For example, the relaying processing circuitry 2042 may be configured to receive an indication as discussed herein in conjunction with any of FIGS. 8, 9, 18, and FIG. 19. In some examples, the relaying processing circuitry 2042 may include functionality for a means for receiving an indication of the at least the first portion of the transport block (e.g., $\alpha$TB) to be encoded by the first user equipment. For example, the relaying processing circuitry 2042 may be configured to receive configuration information as discussed herein in conjunction with any of FIGS. 11, 14, 18, and FIG. 19. In some examples, the relaying processing circuitry 2042 may include functionality for a means for receiving an indication of a transmission order that a first user equipment and a second user equipment are to use to jointly relay a transport block during a slot. For example, the relaying processing circuitry 2042 may be configured to receive configuration information as discussed herein in conjunction with FIG. 18 and/or FIG. 19. In some examples, the relaying processing circuitry 2042 may include functionality for a means for receiving an indication that the user equipment is allocated a plurality of complete symbols within the slot for the encoding the at least the first portion of the transport block. For example, the relaying processing circuitry 2042 may be configured to receive resource allocation information as discussed herein in conjunction with any of FIGS. 15, 18, and FIG. 19. The relaying processing circuitry 2042 may further be configured to execute relaying processing software 2052 stored on the computer-readable medium 2006 to implement one or more functions described herein.

The processor 2004 may further include encoding circuitry 2043, configured to perform one or more of the encoding-related operations described herein (e.g., including those described in conjunction with FIGS. 7-19). In some examples, the encoding circuitry 2043 may include functionality for a means for encoding at least a portion of a transport block. For example, the encoding circuitry 2043 may be configured to encode a set of bits using one or more of the encoding techniques described herein in conjunction with FIGS. 8-17. In some examples, the encoding circuitry 2043 may include functionality for a means for transmitting the encoded data during a slot. For example, the encoding circuitry 2043 may be configured to transmit encoded bits via REs of a slot as described herein in conjunction with FIGS. 8-17. In some examples, the encoding circuitry 2043 may include functionality for a means for transmitting sidelink control information with the encoded data. For example, the encoding circuitry 2043 may be configured to transmit control information in a slot as described herein in conjunction with FIGS. 10, 12, 13, and 19. The encoding circuitry 2043 may further be configured to execute encoding software 2053 stored on the computer-readable medium 2006 to implement one or more functions described herein.

Figure 21:
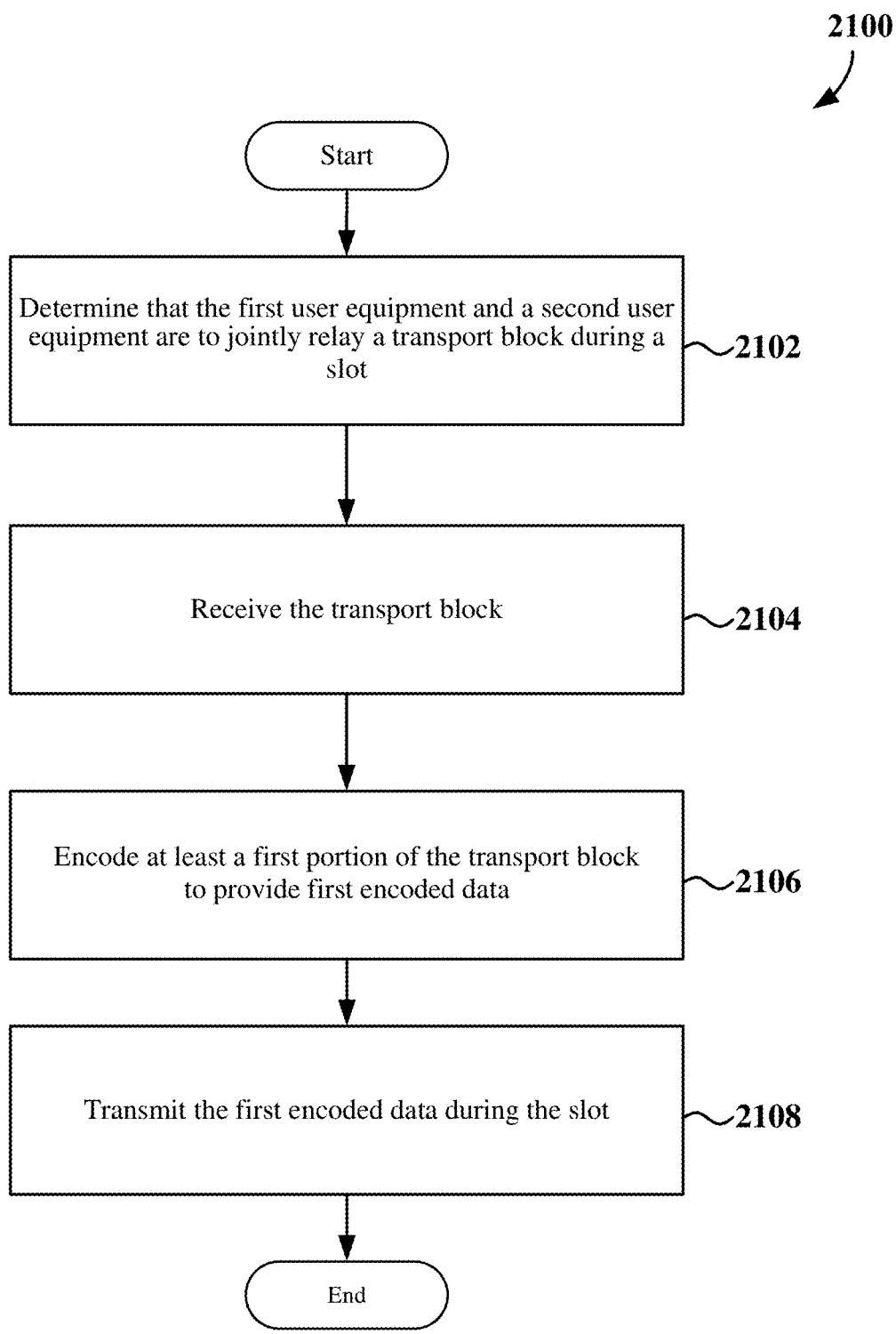
FIG. 21 is a flow chart of an example method for relaying at least a portion of transport block according to some aspects.

FIG. 21 is a flow chart of a method 2100 for a user equipment according to some aspects. As described below, some or all illustrated features may be omitted in a particular implementation within the scope of the present disclosure, and some illustrated features may not be required for implementation of all examples. In some examples, the method 2100 may be performed by the user equipment 2000 (e.g., performed by the processing system 2014), as described above and illustrated in FIG. 20, by a processor or processing system, or by any suitable means for carrying out the described functions.

At block 2102, a user equipment may determine that the first user equipment and a second user equipment are to jointly relay a transport block during a slot. For example, the relaying processing circuitry 2042, shown and described above in connection with FIG. 20, may provide a means to determine that the first user equipment and a second user equipment are to jointly relay a transport block during a slot.

In some examples, determining that the first user equipment and the second user equipment are to jointly relay the transport block during the slot may include receiving scheduling information from a wireless communication device, communicating with the second user equipment to reserve a resource to be jointly used by the first user equipment and the second user equipment to relay the transport block, selecting the second user equipment for jointly relaying the transport block, transmitting a request to the second user equipment to jointly relay the transport block, and receiving an acknowledgement to the request from the second user equipment, receiving a request from the second user equipment to jointly relay the transport block, and transmitting an acknowledgement to the second user equipment in response to the request. Here, the scheduling information may include a resource allocation for the first user equipment and the second user equipment to use to jointly relay the transport block At block 2104, the user equipment may receive the transport block. For example, the relaying processing circuitry 2042 in cooperation with the communication and processing circuitry 2041 and the transceiver 2010, shown and described above in connection with FIG. 20, may provide a means to receive the transport block.

At block 2104, the user equipment may encode at least a first portion of the transport block to provide first encoded data. For example, the encoding circuitry 2043, shown and described above in connection with FIG. 20, may provide a means to encode at least a first portion of the transport block to provide first encoded data.

At block 2104, the user equipment may transmit the first encoded data during the slot. For example, the relaying processing circuitry 2042 in cooperation with the communication and processing circuitry 2041 and the transceiver 2010, shown and described above in connection with FIG. 20, may provide a means to transmit the first encoded data during the slot.

In some examples, the method 2100 may further include receiving an indication of a first modulation order to be used by the first user equipment and a second modulation order to be used by the second user equipment. In this case, the second modulation order may be different from the first modulation order.

In some examples, the method 2100 may further include receiving a configured grant that indicates a set of resources to be used by the first user equipment and the second user equipment to jointly relay the transport block.

In some examples, the method 2100 may further include receiving a resource allocation that indicates a first set of symbols to be used by the first user equipment to relay the transport block and a second set of symbols to be used by second user equipment to relay the transport block. In this case, the resource allocation may indicate a gap between the first set of symbols and the second set of symbols.

In some examples, the operations of the method 2100 may correspond to operations of the UE 1 described above. In this case, the first encoded data may correspond to the REs in a first portion of a slot (e.g., as shown in FIG. 8).

In some examples, the method 2100 may further include receiving an indication of a first quantity of resource elements within the slot to be encoded by the first user equipment (e.g., UE 1). In this case, encoding the at least the first portion of the transport block may include encoding the first quantity of resource elements.

In some examples, the method 2100 may further include transmitting sidelink control information with the first encoded data. In this case, the sidelink control information may indicate a sidelink resource allocation to be used by the first user equipment (e.g., UE 1) and the second user equipment (e.g., UE 2) for jointly relaying the transport block to a third user equipment during the slot.

In some examples, the method 2100 may further include receiving downlink control information that indicates resources to be used by the first user equipment (e.g., UE 1) to transmit the first encoded data to a base station during the slot.

In some examples, the method 2100 may further include receiving an indication of a first quantity of resource elements and a first quantity of symbols within the slot to be encoded by the first user equipment (e.g., UE 1). In this case, encoding the at least the first portion of the transport block to provide the first encoded data may include encoding the transport block based on the first quantity of resource elements and the first quantity of symbols. In some examples, the method may further include transmitting sidelink control information with the first encoded data, where the sidelink control information indicates a sidelink resource allocation to be used by the first user equipment (e.g., UE 1) to transmit the first encoded data to a third user equipment (e.g., the UE 1902 of FIG. 19) during the slot.

In some examples, the method 2100 may further include receiving an indication of the at least the first portion of the transport block to be encoded by the first user equipment (e.g., UE 1). In some examples, the method may further include receiving an indication of a transmission order that the first user equipment (e.g., UE 1) and the second user equipment (e.g., UE 2) are to use to jointly relay the transport block during the slot.

In some examples, the method 2100 may further include receiving an indication that the first user equipment (e.g., UE 1) is allocated a plurality of complete symbols within the slot for the encoding the at least the first portion of the transport block. For example, UE 1 may be allocated symbols 0-3 as shown in FIG. 15.

In some examples, the operations of the method 2100 may correspond to operations of the UE 2 described above. In this case, the first encoded data may correspond to the REs in the second portion of the slot (e.g., as shown in FIG. 8)

In some examples, the method 2100 may further include receiving an indication of a first quantity of resource elements within the slot to be encoded by the second user equipment (e.g., UE 1). In this case, encoding the at least the first portion of the transport block may include encoding a second quantity of resource elements in the slot that follow the first quantity of resource elements. In some examples, encoding the second quantity of resource elements may include identifying a location within the slot corresponding to an end of the first quantity of resource elements, and commencing the encoding the second quantity of resource elements after the location within the slot.

In some examples, the method 2100 may further include receiving a first indication of a first quantity of resource elements and a first quantity of symbols within the slot to be encoded by the second user equipment (e.g., UE 1) and a second indication of a second quantity of resource elements and a second quantity of symbols within the slot to be encoded by the first user equipment (e.g., UE 2). In this case, encoding the at least the first portion of the transport block may include encoding the transport block based on the second quantity of resource elements and the second quantity of symbols. In some examples, encoding the at least the first portion of the transport block may include encoding the second quantity of resource elements independent of encoding of the first quantity of resource elements by the second user equipment (e.g., UE 1). In some examples, the method may further include transmitting sidelink control information with the first encoded data, where the sidelink control information indicates a sidelink resource allocation to be used by the first user equipment (e.g., UE 2) to transmit the first encoded data to a third user equipment (e.g., the UE 1902 of FIG. 19) during the slot.

In some examples, the method 2100 may further include receiving an indication of at least a second portion of the transport block to be encoded by the second user equipment (e.g., UE 1). In addition, the method may further include identifying, based on the indication, a location in the slot where the at least a second portion of the transport block encoded by the second user equipment (e.g., UE 1) ends, where the first encoded data commences after the location within the slot.

In some examples, the method 2100 may further include receiving an indication that the first user equipment (e.g., UE 2) is allocated a first plurality of complete symbols within the slot. In addition, the method may further include identifying a specific symbol within the slot where the first plurality of complete symbols ends, where the first encoded data commences after the specific symbol within the slot.

In one configuration, the user equipment 2000 includes means for determining that the first user equipment and a second user equipment are to jointly relay a transport block during a slot, means for receiving the transport block, means for encoding at least a first portion of the transport block to provide first encoded data, and means for transmitting the first encoded data during the slot. In one aspect, the aforementioned means may be the processor 2004 shown in FIG. 20 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 2004 is merely provided as an example, and other means for carrying out the described functions may be included within various aspects of the present disclosure, including but not limited to the instructions stored in the computer-readable medium 2006, or any other suitable apparatus or means described in any one or more of FIGS. 1, 3, 4, 6, 9, 18, 19, and 20 utilizing, for example, the methods and/or algorithms described herein in relation to FIG. 21.

Figure 22:
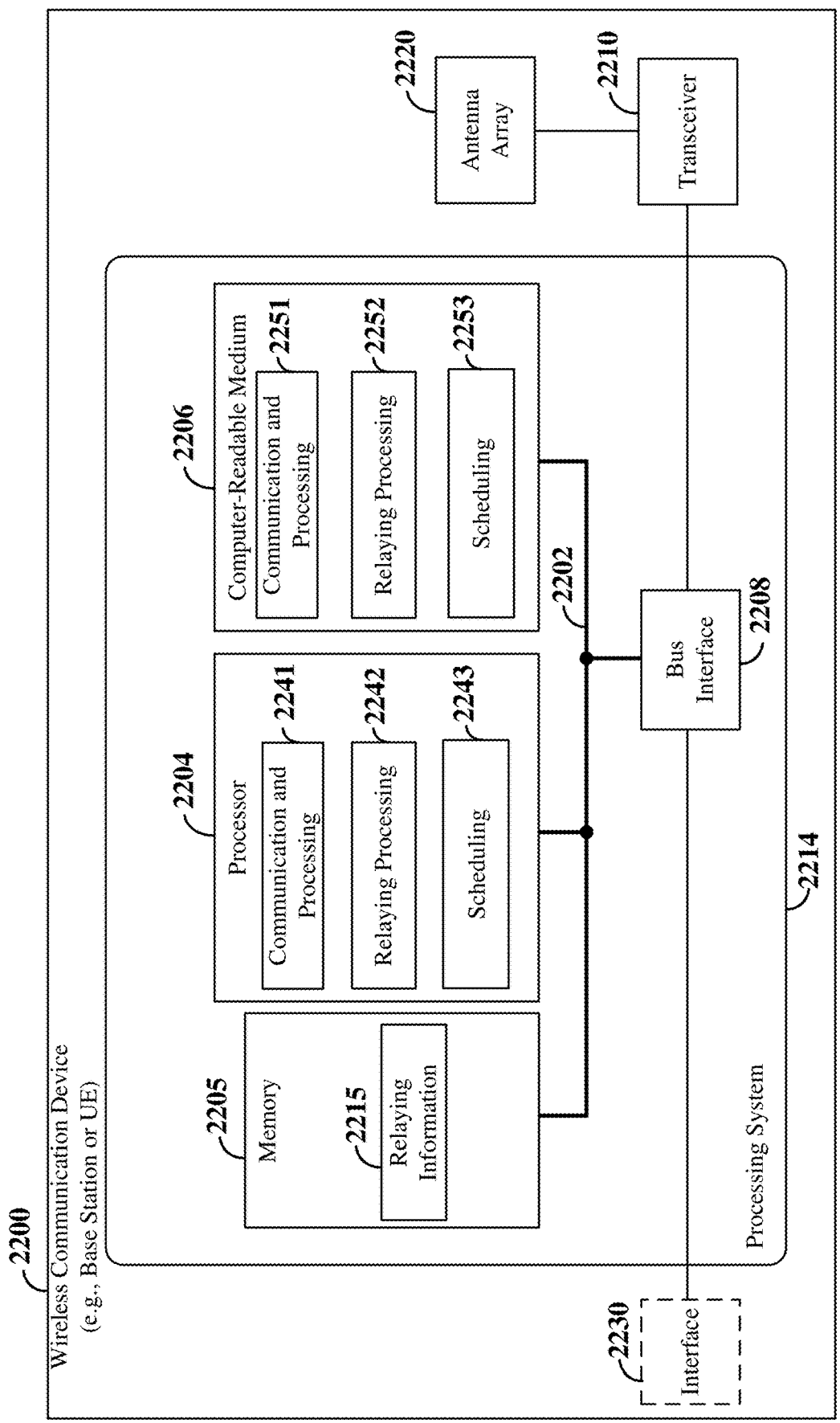
FIG. 22 is a block diagram illustrating an example of a hardware implementation for a wireless communication device (e.g., a base station or a user equipment) employing a processing system according to some aspects.

FIG. 22 is a conceptual diagram illustrating an example of a hardware implementation for a wireless communication device 2200 employing a processing system 2214. In some implementations, the wireless communication device 2200 may correspond to any of the remote UEs, base stations (e.g., gNBs), or scheduling entities as illustrated in any of FIGS. 1, 3, 4, 6, 18, and 19.

In accordance with various aspects of the disclosure, an element, or any portion of an element, or any combination of elements may be implemented with the processing system 2214. The processing system may include one or more processors 2204. The processing system 2214 may be substantially the same as the processing system 2014 illustrated in FIG. 20, including a bus interface 2208, a bus 2202, memory 2205, a processor 2204, a transceiver 2210, an antenna array 2220, and a computer-readable medium 2206. The memory 2205 may store relaying information 2215 (e.g., relaying parameters) used by the processor 2204 in cooperation with the transceiver 2210 for scheduling relaying operations. Furthermore, the wireless communication device 2200 may include an interface 2230 (e.g., a network interface) that provides a means for communicating with at least one other apparatus within a core network and with at least one radio access network.

The wireless communication device 2200 may be configured to perform any one or more of the operations described herein (e.g., as described above in conjunction with FIGS. 1-19 and as described below in conjunction with FIG. 23). In some aspects of the disclosure, the processor 2204, as utilized in the wireless communication device 2200, may include circuitry configured for various functions.

The processor 2204 may be configured to generate, schedule, and modify a resource assignment or grant of time-frequency resources (e.g., a set of one or more resource elements). For example, the processor 2204 may schedule time-frequency resources within a plurality of time division duplex (TDD) and/or frequency division duplex (FDD) subframes, slots, and/or mini-slots to carry user data traffic and/or control information to and/or from multiple UEs.

The processor 2204 may be configured to schedule resources for the transmission of sidelink signals, downlink signals, or uplink signals. The processor 2204 may be configured to schedule resources for relaying operations.

In some aspects of the disclosure, the processor 2204 may include communication and processing circuitry 2241. The communication and processing circuitry 2244 may be configured to communicate with a UE. The communication and processing circuitry 2241 may include one or more hardware components that provide the physical structure that performs various processes related to communication (e.g., signal reception and/or signal transmission) as described herein. The communication and processing circuitry 2241 may further include one or more hardware components that provide the physical structure that performs various processes related to signal processing (e.g., processing a received signal and/or processing a signal for transmission) as described herein. The communication and processing circuitry 2241 may further be configured to execute communication and processing software 2251 included on the computer-readable medium 2206 to implement one or more functions described herein.

The communication and processing circuitry 2241 may further be configured to receive an indication from the UE. For example, the indication may be included in a MAC-CE carried in a Uu PUSCH or a PSCCH, or included in a Uu RRC message or an SL RRC message, or included in a dedicated Uu PUCCH or PUSCH. The communication and processing circuitry 2241 may further be configured to receive a scheduling request from a UE for an uplink grant or a sidelink grant.

In some implementations wherein the communication involves receiving information, the communication and processing circuitry 2241 may obtain information from a component of the wireless communication device 2200 (e.g., from the transceiver 2210 that receives the information via radio frequency signaling or some other type of signaling suitable for the applicable communication medium), process (e.g., decode) the information, and output the processed information. For example, the communication and processing circuitry 2241 may output the information to another component of the processor 2204, to the memory 2205, or to the bus interface 2208. In some examples, the communication and processing circuitry 2241 may receive one or more of signals, messages, other information, or any combination thereof. In some examples, the communication and processing circuitry 2241 may receive information via one or more channels. In some examples, the communication and processing circuitry 2241 may include functionality for a means for receiving. In some examples, the communication and processing circuitry 2241 may include functionality for a means for decoding.

In some implementations wherein the communication involves sending (e.g., transmitting) information, the communication and processing circuitry 2241 may obtain information (e.g., from another component of the processor 2204, the memory 2205, or the bus interface 2208), process (e.g., encode) the information, and output the processed information. For example, the communication and processing circuitry 2241 may output the information to the transceiver 2210 (e.g., that transmits the information via radio frequency signaling or some other type of signaling suitable for the applicable communication medium). In some examples, the communication and processing circuitry 2241 may send one or more of signals, messages, other information, or any combination thereof. In some examples, the communication and processing circuitry 2241 may send information via one or more channels. In some examples, the communication and processing circuitry 2241 may include functionality for a means for sending (e.g., a means for transmitting). In some examples, the communication and processing circuitry 2241 may include functionality for a means for encoding.

The processor 2204 may further include relaying processing circuitry 2242, configured to perform one or more of the relaying processing-related operations described herein (e.g., including those described in conjunction with FIGS. 7-19). In some examples, the relaying processing circuitry 2242 may include functionality for receiving an encoded at least a first portion of transport block from a user equipment during a slot. For example, the relaying processing circuitry 2042 may be configured to receive a set of encoded bits from UEs that have been grouped for joint encoding as discussed herein in conjunction with any of FIGS. 8-19. In some examples, the relaying processing circuitry 2242 may include functionality for transmitting one or more indications as discussed herein. For example, the relaying processing circuitry 2042 may be configured to transmit configuration information to UEs that have been grouped for joint encoding as discussed herein in conjunction with any of FIGS. 8-19. The relaying processing circuitry 2242 may further be configured to execute relaying processing software 2252 stored on the computer-readable medium 2206 to implement one or more functions described herein.

The processor 2204 may further include scheduling circuitry 2243, configured to perform one or more of the scheduling-related operations described herein (e.g., including those described in conjunction with FIGS. 7-19). In some examples, the scheduling circuitry 2243 may include functionality for a means for determining that UEs are to jointly relay a transport block. For example, the scheduling circuitry 2243 may be configured to form a relaying group as discussed herein in conjunction with FIG. 18 and/or FIG. 19. In some examples, the scheduling circuitry 2243 may include functionality for selecting a first user equipment and the second user equipment for jointly relaying a transport block. For example, the scheduling circuitry 2243 may be configured to form a relaying group as discussed herein in conjunction with FIG. 18 and/or FIG. 19. In some examples, the scheduling circuitry 2243 may include functionality for a means for generating scheduling information. For example, the scheduling circuitry 2243 may determine that UEs are able to support joint relaying and then schedule resources for the relay operation. In some examples, the scheduling circuitry 2243 may include functionality for a means for transmitting scheduling information (e.g., one or more resource-related indications as discussed herein). For example, the scheduling circuitry 2243 may be configured to transmit scheduling information to UEs via a control channel (e.g., a PDCCH or a PSCCH). The scheduling circuitry 2243 may further be configured to execute scheduling software 2253 stored on the computer-readable medium 2206 to implement one or more functions described herein.

Figure 23:
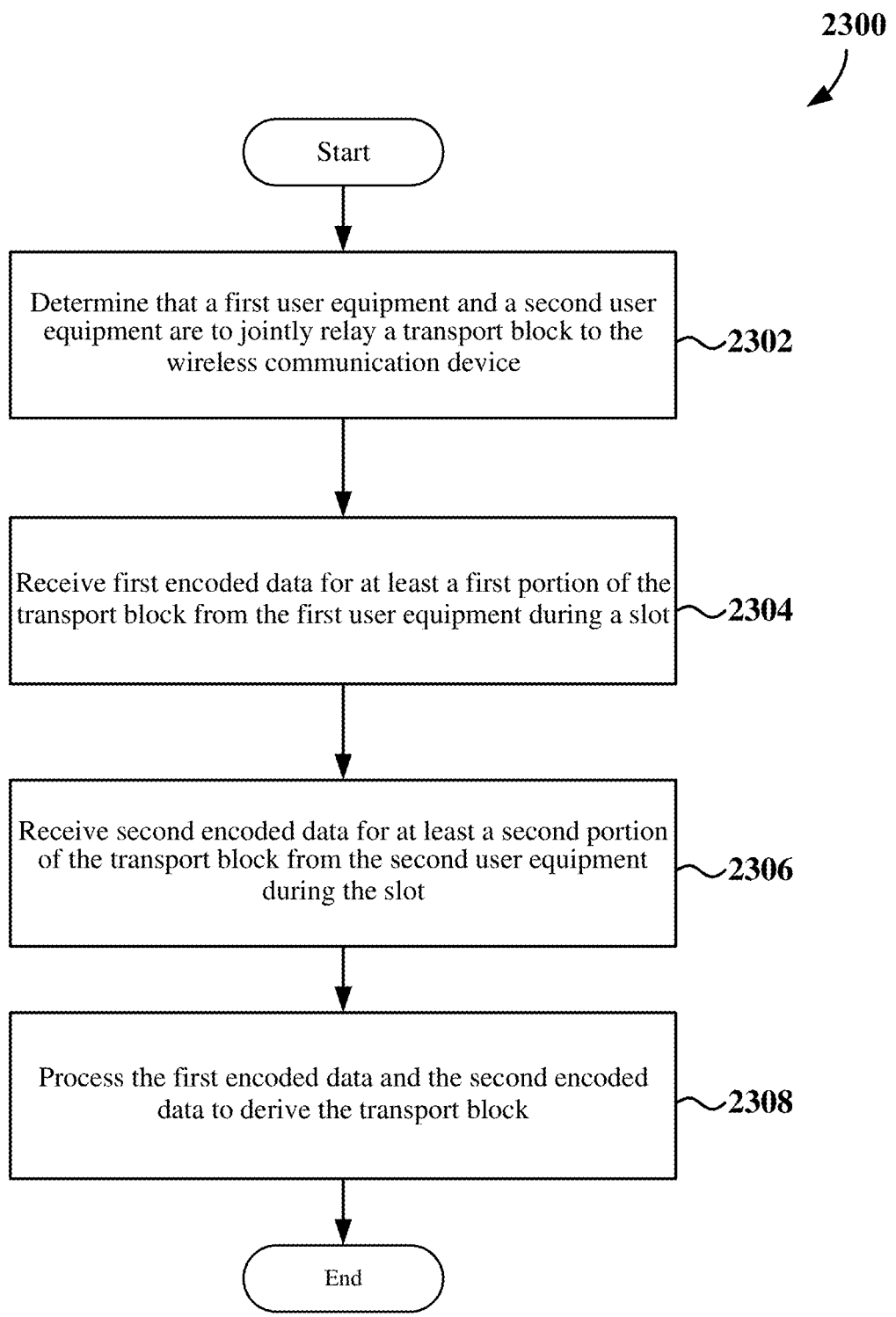
FIG. 23 is a flow chart of an example method for obtaining a transport block that was jointly relayed by a first user equipment and a second user equipment according to some aspects.

FIG. 23 is a flow chart of a method 2300 for a wireless communication device according to some aspects. As described below, some or all illustrated features may be omitted in a particular implementation within the scope of the present disclosure, and some illustrated features may not be required for implementation of all examples. In some examples, the method 2300 may be performed by the wireless communication device 2200 (e.g., performed by the processing system 2214), as described above and illustrated in FIG. 22, by a processor or processing system, or by any suitable means for carrying out the described functions.

At block 2302, a wireless communication device may determine that a first user equipment and a second user equipment are to jointly relay a transport block to the wireless communication device. For example, the scheduling circuitry 2243 may provide a means to determine that a first user equipment and a second user equipment are to jointly relay a transport block to the wireless communication device.

In some examples, determining that the first user equipment and the second user equipment are to jointly relay the transport block during the slot may include selecting the first user equipment and the second user equipment for jointly relaying the transport block, and transmitting scheduling information to the first user equipment and the second user equipment. In this case, the scheduling information may include a resource allocation for the first user equipment and the second user equipment to use to jointly relay the transport block. In some examples, determining that the first user equipment and the second user equipment are to jointly relay the transport block during the slot may include receiving an indication that the first user equipment and the second user equipment have been grouped for joint relaying operations.

At block 2304, the wireless communication device may receive first encoded data for at least a first portion of the transport block from the first user equipment during a slot. For example, the relaying processing circuitry 2242 in cooperation with the communication and processing circuitry 2241 and the transceiver 2210, shown and described above in connection with FIG. 22, may provide a means to receive first encoded data for at least a first portion of the transport block from the first user equipment during a slot.

At block 2306, the wireless communication device may receive second encoded data for at least a second portion of the transport block from the second user equipment during the slot. For example, the relaying processing circuitry 2242 in cooperation with the communication and processing circuitry 2241 and the transceiver 2210, shown and described above in connection with FIG. 22, may provide a means to receive second encoded data for at least a second portion of the transport block from the second user equipment during the slot.

At block 2308, the wireless communication device may process the first encoded data and the second encoded data to derive the transport block. For example, the relaying processing circuitry 2242, shown and described above in connection with FIG. 22, may provide a means to process the first encoded data and the second encoded data to derive the transport block.

In some examples, the method 2300 may further include transmitting a first indication of a first quantity of resource elements within the slot to be encoded by the first user equipment, and a second indication of a second quantity of resource elements within the slot to be encoded by the second user equipment.

In some examples, the method 2300 may further include transmitting a first indication of a first quantity of resource elements and a first quantity of symbols within the slot to be encoded by the first user equipment; and a second indication of a second quantity of resource elements and a second quantity of symbols within the slot to be encoded by the second user equipment.

In some examples, the method 2300 may further include transmitting a first indication of at least a first portion of the transport block to be encoded by the first user equipment, and a second indication of at least a second portion of the transport block to be encoded by the second user equipment.

In some examples, the method 2300 may further include transmitting an indication of a transmission order that the first user equipment and the second user equipment are to use to jointly relay the transport block during the slot.

In some examples, the method 2300 may further include transmitting a first indication that the first user equipment is allocated a first plurality of complete symbols within the slot for the first encoded data, and a second indication that the second user equipment is allocated a second plurality of complete symbols within the slot for the second encoded data.

In some examples, the method 2300 may further include transmitting a first indication of a first modulation order to be used by the first user equipment, and a second indication of a second modulation order to be used by the second user equipment. In this case, the second modulation order may be different from the first modulation order.

In one configuration, the wireless communication device 2200 includes means for determining that a first user equipment and a second user equipment are to jointly relay a transport block to the wireless communication device, means for receiving first encoded data for at least a first portion of the transport block from the first user equipment during a slot, means for receiving second encoded data for at least a second portion of the transport block from the second user equipment during the slot, and means for processing the first encoded data and the second encoded data to derive the transport block. In one aspect, the aforementioned means may be the processor 2204 shown in FIG. 22 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 2204 is merely provided as an example, and other means for carrying out the described functions may be included within various aspects of the present disclosure, including but not limited to the instructions stored in the computer-readable medium 2206, or any other suitable apparatus or means described in any one or more of FIGS. 1, 3, 4, 6, 9, 18, 19, and 22, and utilizing, for example, the methods and/or algorithms described herein in relation to FIG. 23.

The methods shown in FIGS. 21 and 23 may include additional aspects, such as any single aspect or any combination of aspects described below and/or in connection with one or more other processes described elsewhere herein. The following provides an overview of several aspects of the present disclosure.

Aspect 1: A method for wireless communication at a user equipment, the method comprising: determining that the first user equipment and a second user equipment are to jointly relay a transport block during a slot; receiving the transport block; encoding at least a first portion of the transport block to provide first encoded data; and transmitting the first encoded data during the slot.

Aspect 2: The method of aspect 1, wherein the encoding the at least the first portion of the transport block to provide the first encoded data comprises: encoding the at least the first portion of the transport block based on a quantity of resource elements allocated for the first user equipment and the second user equipment to jointly relay the transport block.

Aspect 3: The method of aspect 1 or 2, further comprising: receiving an indication of a first quantity of resource elements within the slot to be encoded by the first user equipment, wherein the encoding the at least the first portion of the transport block comprises encoding the first quantity of resource elements.

Aspect 4: The method of any of aspects 1 through 3, further comprising: transmitting sidelink control information with the first encoded data, wherein the sidelink control information indicates a sidelink resource allocation to be used by the first user equipment and the second user equipment for jointly relaying the transport block to a third user equipment during the slot.

Aspect 5: The method of any of aspects 1 through 4, further comprising: receiving downlink control information that indicates resources to be used by the first user equipment to transmit the first encoded data to a base station during the slot.

Aspect 6: The method of any of aspects 1 through 5, further comprising: receiving an indication of a first quantity of resource elements and a first quantity of symbols within the slot to be encoded by the first user equipment, wherein the encoding the at least the first portion of the transport block to provide the first encoded data comprises encoding the transport block based on the first quantity of resource elements and the first quantity of symbols.

Aspect 7: The method of any of aspects 1 through 6, further comprising: transmitting sidelink control information with the first encoded data, wherein the sidelink control information indicates a sidelink resource allocation to be used by the first user equipment to transmit the first encoded data to a third user equipment during the slot.

Aspect 8: The method of any of aspects 1 through 7, further comprising: receiving a first indication of the at least the first portion of the transport block to be encoded by the first user equipment; or receiving a second indication of a transmission order that the first user equipment and the second user equipment are to use to jointly relay the transport block during the slot.

Aspect 9: The method of any of aspects 1 through 8, further comprising: receiving an indication that the first user equipment is allocated a plurality of complete symbols within the slot for the encoding the at least the first portion of the transport block.

Aspect 10: The method of any of aspects 1 through 9, further comprising: receiving an indication of a first quantity of resource elements within the slot to be encoded by the second user equipment, wherein the encoding the at least the first portion of the transport block comprises encoding a second quantity of resource elements in the slot that follow the first quantity of resource elements.

Aspect 11: The method of aspect 10, wherein the encoding the second quantity of resource elements comprises: identifying a location within the slot corresponding to an end of the first quantity of resource elements; and commencing the encoding the second quantity of resource elements after the location within the slot.

Aspect 12: The method of any of aspects 1 through 11, further comprising: receiving a first indication of a first quantity of resource elements and a first quantity of symbols within the slot to be encoded by the second user equipment and a second indication of a second quantity of resource elements and a second quantity of symbols within the slot to be encoded by the first user equipment, wherein the encoding the at least the first portion of the transport block comprises encoding the transport block based on the second quantity of resource elements and the second quantity of symbols.

Aspect 13: The method of aspect 12, wherein the encoding the at least the first portion of the transport block comprises: encoding the second quantity of resource elements independent of encoding of the first quantity of resource elements by the second user equipment.

Aspect 14: The method of any of aspects 12 through 13, further comprising: transmitting sidelink control information with the first encoded data, wherein the sidelink control information indicates a sidelink resource allocation to be used by the first user equipment to transmit the first encoded data to a third user equipment during the slot.

Aspect 15: The method of any of aspects 1 through 14, further comprising: receiving an indication of at least a second portion of the transport block to be encoded by the second user equipment; and identifying, based on the indication, a location in the slot where the at least the second portion of the transport block encoded by the second user equipment ends, wherein the first encoded data commences after the location within the slot.

Aspect 16: The method of any of aspects 1 through 15, further comprising: receiving an indication that the first user equipment is allocated a first plurality of complete symbols within the slot; and identifying a specific symbol within the slot where the first plurality of complete symbols ends, wherein the first encoded data commences after the specific symbol within the slot.

Aspect 17: The method of any of aspects 1 through 16, further comprising: receiving an indication of a first modulation order to be used by the first user equipment and a second modulation order to be used by the second user equipment, wherein the second modulation order is different from the first modulation order.

Aspect 18: The method of any of aspects 1 through 17, further comprising: receiving a configured grant that indicates a set of resources to be used by the first user equipment and the second user equipment to jointly relay the transport block.

Aspect 19: The method of any of aspects 1 through 18, further comprising: receiving a resource allocation that indicates a first set of symbols to be used by the first user equipment to relay the transport block and a second set of symbols to be used by the second user equipment to relay the transport block, wherein the resource allocation further indicates a gap between the first set of symbols and the second set of symbols.

Aspect 20: The method of any of aspects 1 through 19, wherein the determining that the first user equipment and the second user equipment are to jointly relay the transport block during the slot comprises: receiving scheduling information from a wireless communication device, wherein the scheduling information comprises a resource allocation for the first user equipment and the second user equipment to use to jointly relay the transport block; or communicating with the second user equipment to reserve a resource to be jointly used by the first user equipment and the second user equipment to relay the transport block; or selecting the second user equipment for jointly relaying the transport block, transmitting a first request to the second user equipment to jointly relay the transport block, and receiving an acknowledgement to the first request from the second user equipment; or receiving a second request from the second user equipment to jointly relay the transport block, and transmitting an acknowledgement to the second user equipment in response to the second request.

Aspect 22: A method for wireless communication at a wireless communication device, the method comprising: determining that a first user equipment and a second user equipment are to jointly relay a transport block to the wireless communication device; receiving first encoded data for at least a first portion of the transport block from the first user equipment during a slot; receiving second encoded data for at least a second portion of the transport block from the second user equipment during the slot; and processing the first encoded data and the second encoded data to derive the transport block.

Aspect 23: The method of aspect 22, wherein the determining that the first user equipment and the second user equipment are to jointly relay the transport block during the slot comprises: selecting the first user equipment and the second user equipment for jointly relaying the transport block, and transmitting scheduling information to the first user equipment and the second user equipment, wherein the scheduling information comprises a resource allocation for the first user equipment and the second user equipment to use to jointly relay the transport block; or receiving an indication that the first user equipment and the second user equipment have been grouped for joint relaying operations.

Aspect 24: The method of any of aspects 22 through 23, further comprising transmitting: a first indication of a first quantity of resource elements within the slot to be encoded by the first user equipment; and a second indication of a second quantity of resource elements within the slot to be encoded by the second user equipment.

Aspect 25: The method of any of aspects 22 through 24, further comprising transmitting: a first indication of a first quantity of resource elements and a first quantity of symbols within the slot to be encoded by the first user equipment; and a second indication of a second quantity of resource elements and a second quantity of symbols within the slot to be encoded by the second user equipment.

Aspect 26: The method of any of aspects 22 through 25, further comprising transmitting: a first indication of the at least the first portion of the transport block to be encoded by the first user equipment; and a second indication of the at least the second portion of the transport block to be encoded by the second user equipment.

Aspect 27: The method of any of aspects 22 through 26, further comprising: transmitting an indication of a transmission order that the first user equipment and the second user equipment are to use to jointly relay the transport block during the slot.

Aspect 28: The method of any of aspects 22 through 27, further comprising transmitting: a first indication that the first user equipment is allocated a first plurality of complete symbols within the slot for the first encoded data; and a second indication that the second user equipment is allocated a second plurality of complete symbols within the slot for the second encoded data.

Aspect 29: The method of any of aspects 22 through 27, further comprising transmitting: a first indication of a first modulation order to be used by the first user equipment; and a second indication of a second modulation order to be used by the second user equipment, wherein the second modulation order is different from the first modulation order.

Aspect 30: A user equipment comprising: a transceiver configured to communicate with a radio access network, a memory, and a processor communicatively coupled to the transceiver and the memory, wherein the processor and the memory are configured to perform any one of aspects 1 through 20.

Aspect 31: An apparatus configured for wireless communication comprising at least one means for performing any one of aspects 1 through 20.

Aspect 32: A non-transitory computer-readable medium storing computer-executable code, comprising code for causing an apparatus to perform any one of aspects 1 through 20.

Aspect 33: A base station comprising: a transceiver, a memory, and a processor communicatively coupled to the transceiver and the memory, wherein the processor and the memory are configured to perform any one of aspects 22 through 29.

Aspect 34: An apparatus configured for wireless communication comprising at least one means for performing any one of aspects 22 through 29.

Aspect 35: A non-transitory computer-readable medium storing computer-executable code, comprising code for causing an apparatus to perform any one of aspects 22 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-23 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 4, 6, 18, 19, 20, and 22 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a first user equipment, the method comprising:
   determining that the first user equipment and a second user equipment are to jointly relay a transport block during a first portion of a slot and a second portion of the slot, respectively;
   receiving the transport block;
   encoding at least a first portion of the transport block to provide first encoded data; and
   transmitting the first encoded data during the first portion of the slot.

2. The method of claim 1, wherein the encoding the at least the first portion of the transport block to provide the first encoded data comprises:
   encoding the at least the first portion of the transport block based on a quantity of resource elements allocated for the first user equipment and the second user equipment to jointly relay the transport block.

3. The method of claim 1, further comprising:
   receiving an indication of a first quantity of resource elements within the slot to be encoded by the first user equipment,
   wherein the encoding the at least the first portion of the transport block comprises encoding the first quantity of resource elements.

4. The method of claim 1, further comprising:
   transmitting sidelink control information with the first encoded data, wherein the sidelink control information indicates a sidelink resource allocation to be used by the first user equipment and the second user equipment for jointly relaying the transport block to a third user equipment during the slot.

5. The method of claim 1, further comprising:
   receiving downlink control information that indicates resources to be used by the first user equipment to transmit the first encoded data to a base station during the slot.

6. The method of claim 1, further comprising:
   receiving an indication of a first quantity of resource elements and a first quantity of symbols within the slot to be encoded by the first user equipment, wherein the encoding the at least the first portion of the transport block to provide the first encoded data comprises encoding the transport block based on the first quantity of resource elements and the first quantity of symbols.

7. The method of claim 1, further comprising:
transmitting sidelink control information with the first encoded data, wherein the sidelink control information indicates a sidelink resource allocation to be used by the first user equipment to transmit the first encoded data to a third user equipment during the slot.

8. The method of claim 1, further comprising:
receiving a first indication of the at least the first portion of the transport block to be encoded by the first user equipment; or
receiving a second indication of a transmission order that the first user equipment and the second user equipment are to use to jointly relay the transport block during the slot.

9. The method of claim 1, further comprising:
receiving an indication that the first user equipment is allocated a plurality of complete symbols within the slot for the encoding the at least the first portion of the transport block.

10. The method of claim 1, further comprising:
receiving an indication of a first quantity of resource elements within the slot to be encoded by the second user equipment,
wherein the encoding the at least the first portion of the transport block comprises encoding a second quantity of resource elements in the slot that follow the first quantity of resource elements.

11. The method of claim 10, wherein the encoding the second quantity of resource elements comprises:
identifying a location within the slot corresponding to an end of the first quantity of resource elements; and
commencing the encoding the second quantity of resource elements after the location within the slot.

12. The method of claim 1, further comprising:
receiving a first indication of a first quantity of resource elements and a first quantity of symbols within the slot to be encoded by the second user equipment and a second indication of a second quantity of resource elements and a second quantity of symbols within the slot to be encoded by the first user equipment,
wherein the encoding the at least the first portion of the transport block comprises encoding the transport block based on the second quantity of resource elements and the second quantity of symbols.

13. The method of claim 12, wherein the encoding the at least the first portion of the transport block comprises:
encoding the second quantity of resource elements independent of encoding of the first quantity of resource elements by the second user equipment.

14. The method of claim 13, further comprising:
transmitting sidelink control information with the first encoded data, wherein the sidelink control information indicates a sidelink resource allocation to be used by the first user equipment to transmit the first encoded data to a third user equipment during the slot.

15. The method of claim 1, further comprising:
receiving an indication of at least a second portion of the transport block to be encoded by the second user equipment; and
identifying, based on the indication, a location in the slot where the at least the second portion of the transport block encoded by the second user equipment ends,
wherein the first encoded data commences after the location within the slot.

16. The method of claim 1, further comprising:
receiving an indication that the first user equipment is allocated a first plurality of complete symbols within the slot; and
identifying a specific symbol within the slot where the first plurality of complete symbols ends,
wherein the first encoded data commences after the specific symbol within the slot.

17. The method of claim 1, further comprising:
receiving an indication of a first modulation order to be used by the first user equipment and a second modulation order to be used by the second user equipment, wherein the second modulation order is different from the first modulation order.

18. The method of claim 1, further comprising:
receiving a configured grant that indicates a set of resources to be used by the first user equipment and the second user equipment to jointly relay the transport block.

19. The method of claim 1, further comprising:
receiving a resource allocation that indicates a first set of symbols to be used by the first user equipment to relay the transport block and a second set of symbols to be used by the second user equipment to relay the transport block,
wherein the resource allocation further indicates a gap between the first set of symbols and the second set of symbols.

20. The method of claim 1, wherein the determining that the first user equipment and the second user equipment are to jointly relay the transport block during the slot comprises:
receiving scheduling information from a wireless communication device, wherein the scheduling information comprises a resource allocation for the first user equipment and the second user equipment to use to jointly relay the transport block;
communicating with the second user equipment to reserve a resource to be jointly used by the first user equipment and the second user equipment to relay the transport block;
selecting the second user equipment for jointly relaying the transport block, transmitting a first request to the second user equipment to jointly relay the transport block, and receiving an acknowledgement to the first request from the second user equipment; or
receiving a second request from the second user equipment to jointly relay the transport block, and transmitting an acknowledgement to the second user equipment in response to the second request.

21. A first user equipment, comprising:
a transceiver;
a memory; and
a processor communicatively coupled to the transceiver and the memory, wherein the processor and the memory are configured to:
determine that the first user equipment and a second user equipment are to jointly relay a transport block during a first portion of a slot and a second portion of the slot, respectively;
receive the transport block via the transceiver;
encode at least a first portion of the transport block to provide first encoded data; and
transmit the first encoded data during the first portion of the slot via the transceiver.

22. A method for wireless communication at a wireless communication device, the method comprising:
- determining that a first user equipment and a second user equipment are to jointly relay a transport block to the wireless communication device during a first portion of a slot and a second portion of the slot, respectively;
- receiving first encoded data for at least a first portion of the transport block from the first user equipment during the first portion of the slot;
- receiving second encoded data for at least a second portion of the transport block from the second user equipment during the second portion of the slot; and
- processing the first encoded data and the second encoded data to derive the transport block.

23. The method of claim 22, wherein the determining that the first user equipment and the second user equipment are to jointly relay the transport block during the slot comprises:
- selecting the first user equipment and the second user equipment for jointly relaying the transport block, and transmitting scheduling information to the first user equipment and the second user equipment, wherein the scheduling information comprises a resource allocation for the first user equipment and the second user equipment to use to jointly relay the transport block; or
- receiving an indication that the first user equipment and the second user equipment have been grouped for joint relaying operations.

24. The method of claim 22, further comprising transmitting:
- a first indication of a first quantity of resource elements within the slot to be encoded by the first user equipment; and
- a second indication of a second quantity of resource elements within the slot to be encoded by the second user equipment.

25. The method of claim 22, further comprising transmitting:
- a first indication of a first quantity of resource elements and a first quantity of symbols within the slot to be encoded by the first user equipment; and
- a second indication of a second quantity of resource elements and a second quantity of symbols within the slot to be encoded by the second user equipment.

26. The method of claim 22, further comprising transmitting:
- a first indication of the at least the first portion of the transport block to be encoded by the first user equipment; and
- a second indication of the at least the second portion of the transport block to be encoded by the second user equipment.

27. The method of claim 22, further comprising:
- transmitting an indication of a transmission order that the first user equipment and the second user equipment are to use to jointly relay the transport block during the slot.

28. The method of claim 22, further comprising transmitting:
- a first indication that the first user equipment is allocated a first plurality of complete symbols within the slot for the first encoded data; and
- a second indication that the second user equipment is allocated a second plurality of complete symbols within the slot for the second encoded data.

29. The method of claim 22, further comprising transmitting:
- a first indication of a first modulation order to be used by the first user equipment; and
- a second indication of a second modulation order to be used by the second user equipment, wherein the second modulation order is different from the first modulation order.

30. A wireless communication device, comprising:
- a transceiver;
- a memory; and
- a processor communicatively coupled to the transceiver and the memory, wherein the processor and the memory are configured to:
  - determine that a first user equipment and a second user equipment are to jointly relay a transport block to the wireless communication device during a first portion of a slot and a second portion of the slot, respectively;
  - receive first encoded data for at least a first portion of the transport block via the transceiver from the first user equipment during the first portion of the slot;
  - receive second encoded data for at least a second portion of the transport block via the transceiver from the second user equipment during the second portion of the slot; and
  - process the first encoded data and the second encoded data to derive the transport block.

* * * * *